(12) United States Patent
Tomita et al.

(10) Patent No.: US 10,794,754 B2
(45) Date of Patent: Oct. 6, 2020

(54) LOADAGE CORRECTION SYSTEM

(71) Applicant: Hitachi Construction Machinery Co., Ltd., Tokyo (JP)

(72) Inventors: Kunitsugu Tomita, Tsuchiura (JP); Akinori Ishii, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 16/493,318

(22) PCT Filed: Jun. 20, 2018

(86) PCT No.: PCT/JP2018/023503
§ 371 (c)(1),
(2) Date: Sep. 12, 2019

(87) PCT Pub. No.: WO2019/012933
PCT Pub. Date: Jan. 17, 2019

(65) Prior Publication Data
US 2020/0033183 A1 Jan. 30, 2020

(30) Foreign Application Priority Data

Jul. 13, 2017 (JP) .................................. 2017-137122

(51) Int. Cl.
*E02F 9/26* (2006.01)
*G01G 23/01* (2006.01)
*G01G 19/08* (2006.01)

(52) U.S. Cl.
CPC .............. *G01G 19/08* (2013.01); *E02F 9/26* (2013.01); *G01G 23/01* (2013.01)

(58) Field of Classification Search
CPC . G01G 23/01; G01G 19/08; E02F 9/26; E02F 9/20

(Continued)

(56) References Cited

U.S. PATENT DOCUMENTS 9,297,690 B2 * 3/2016 Havimaki .............. G01G 23/01
9,464,913 B2 10/2016 Brown et al.
(Continued)

FOREIGN PATENT DOCUMENTS

JP 3830151 B2 10/2006
JP 2008-240461 A 10/2008
(Continued)

OTHER PUBLICATIONS

International Search Report of PCT/JP2018/023503 dated Jul. 17, 2018.

*Primary Examiner* — Jacques M Saint Surin
(74) *Attorney, Agent, or Firm* — Mattingly & Malur, PC

(57) ABSTRACT

A loadage correction system includes a loading-weight measuring unit that measures a loading weight of a work object loaded by a loader, a loadage measuring unit that measures loadage of the work object loaded on a transporter from the loader, a communication unit that performs data transfer of measurement results obtained in the loading-weight measuring unit and the loadage measuring unit, a difference calculating unit that calculates a difference between the measurement results of the loading-weight measuring unit and the loadage measuring unit input from the loading-weight measuring unit and the loadage measuring unit, a difference storing unit that stores a difference calculation result, a correction-target determining unit that determines the loading-weight measuring unit or the loadage measuring unit, the measurement result of which needs to be corrected, from the loading-weight measuring unit and the loadage measuring unit, and a correction-value calculating unit that calculates a correction value for the loading-weight measuring unit or the loadage measuring unit.

8 Claims, 39 Drawing Sheets

(58) Field of Classification Search
USPC .................................................. 177/25.13
See application file for complete search history.

(56) References Cited

U.S. PATENT DOCUMENTS

| | | | |
|---|---|---|---|
| 10,317,273 B2* | 6/2019 | Minoshima | G01G 19/14 |
| 10,704,228 B2* | 7/2020 | Tsuji | B60K 35/00 |
| 2009/0107207 A1* | 4/2009 | Yamazaki | G01G 21/22 |
| | | | 73/1.13 |
| 2012/0290178 A1 | 11/2012 | Suzuki et al. | |
| 2014/0231153 A1 | 8/2014 | Fukasu et al. | |
| 2017/0151946 A1* | 6/2017 | Shiga | B60W 40/076 |
| 2017/0156268 A1* | 6/2017 | Schrag | G01G 13/2851 |
| 2018/0209837 A1* | 7/2018 | Golshany | G06Q 10/083 |

FOREIGN PATENT DOCUMENTS

| | | |
|---|---|---|
| JP | 2009-235819 A | 10/2009 |
| JP | 5230851 B1 | 7/2013 |
| WO | 2011/090077 A1 | 7/2011 |

* cited by examiner

LOADAGE CORRECTION SYSTEM

TECHNICAL FIELD

The present invention relates to a loadage correction system in working machines used in mining, construction work, and the like.

BACKGROUND ART

A loader such as a hydraulic shovel operating in a mine or the like scoops, when a transporter such as a dump truck stops in front of the hydraulic shovel, minerals or gravel from an excavation place with a bucket and turns a turning body to move the bucket to above a vessel of the dump truck. Subsequently, the hydraulic shovel drops soil from the bucket and loads the minerals or the gravel on the vessel of the dump truck. Thereafter, the hydraulic shovel turns the turning body toward the excavation place in order to further load the minerals or the gravel. The hydraulic shovel completes work for loading a predetermined amount of the minerals or the gravel on the vessel of the dump truck by repeating these kinds of work a plurality of times. When the loading work by the hydraulic shovel is completed, the dump truck transports the minerals or the gravel to a predetermined place.

In the loading work in the mine or the like explained above, it is desirable to appropriately perform the loading with respect to a limit loadage of the transporter from the viewpoint of work efficiency. That is, in the loading work, it is important to achieve overload prevention and underload prevention.

For example, in Patent Document 1, a loadage measuring device is provided in a transporter. It is possible to provide loadage of the transporter to an operator of a loader. In addition, Patent Document 1 discloses that a loadage measurement error between a stop time (a loading time) and a traveling time of the transporter is stored and loadage at the stop time is corrected. With such a configuration and correction processing, the operator of the loader can accurately grasp a present loadage of the transporter. Therefore, it is easy to perform appropriate loading with respect to a limit loadage of the transporter.

PRIOR ART DOCUMENT

Patent Document

Patent Document 1: Japanese Patent No. 5230851

SUMMARY OF THE INVENTION

Problems to be Solved by the Invention

However, in the configuration disclosed in Patent Document 1 described above, although a measurement error related to an operation state of the transporter is corrected, when an error occurs in a measurement value itself of the loadage measuring device because of aged deterioration or the like, the error due to the aged deterioration is not corrected. That is, in the configuration disclosed in Patent Document 1 described above, there is a problem in that optimization of loadage is insufficient.

The present invention has been devised in view of such a problem, and an object of the present invention is to provide a loadage correction system that can correct an error due to aged deterioration and more accurately achieve optimization of loadage.

Means for Solving the Problems

In order to achieve the above object, a loadage correction system of the present invention is a loadage correction system including one loader and a plurality of transporters, the loadage correction system including: a loading-weight measuring unit set in the loader, the loading-weight measuring unit measuring a loading weight of a work object loaded by the loader; a loadage measuring unit set in the transporter, the loadage measuring unit measuring loadage of the work object loaded on the transporter from the loader; a communication unit that performs data transfer of measurement results obtained in the loading-weight measuring unit and the loadage measuring unit; a difference calculating unit that calculates a difference between the measurement results of the loading-weight measuring unit and the loadage measuring unit input from the loading-weight measuring unit and the loadage measuring unit directly or via the communication unit; a difference storing unit that stores a difference calculation result by the difference calculating unit; a correction-target determining unit that determines, using stored information of the difference storing unit, the loading-weight measuring unit or the loadage measuring unit, the measurement result of which needs to be corrected, from the loading-weight measuring unit and the loadage measuring unit; and a correction-value calculating unit that calculates a correction value for the loading-weight measuring unit or the loadage measuring unit determined as a correction target by the correction-target determining unit.

Consequently, measurement values of the loading-weight measuring unit set in the loader and the loadage measuring unit set in the transporter are mutually monitored. The correction value and the correction target are determined using the difference between the measurement results of both the measuring units. Therefore, even when an error occurs in the measurement values themselves of the measuring units because of aged deterioration or the like, it is possible to correct the error. Therefore, it is easy to perform appropriate loading with respect to a limit loadage of the transporter. It is possible to achieve improvement of work efficiency.

Advantageous Effects of the Invention

With the loadage correction system of the present invention, the measurement values of the loading-weight measuring unit set in the loader and the loadage measuring unit set in the transporter are mutually monitored. The correction value and the correction target are determined using the difference between the measurement results of both the measuring units. Therefore, even when an error occurs in the measurement values themselves of the measuring units because of aged deterioration or the like, it is possible to correct the error. Therefore, it is easy to perform appropriate loading with respect to a limit loadage of the transporter. It is possible to achieve improvement of work efficiency. That is, with the loadage correction system of the present invention, it is possible to correct an error due to aged deterioration and more accurately achieve optimization of loadage.

MODE FOR CARRYING OUT THE INVENTION

Implementation forms of the present invention are explained in detail below as embodiments with reference to the drawings.

First Embodiment

<Overall Configuration of a Loading Correction System>

Figure 1:
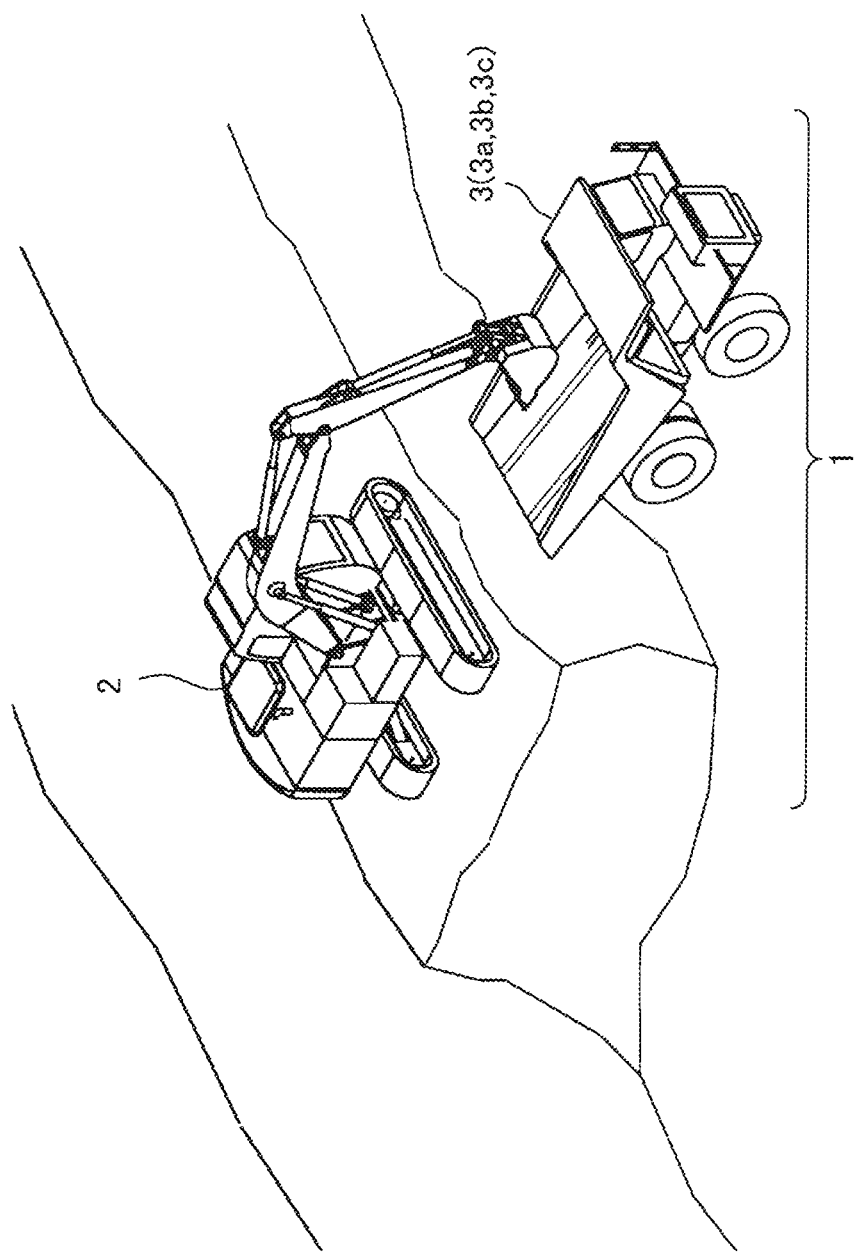
FIG. 1 is an overall configuration diagram of a loadage correction system in a first embodiment.

FIG. 1 is a diagram showing a loader and transporters configuring a loading correction system 1 according to a first embodiment of the present invention.

The loading correction system 1 includes one loader 2 and three transporters 3a, 3b, and 3c. In the first embodiment, the loader 2 is a hydraulic shovel and the transporters 3a, 3b, and 3c are dump trucks.

After an empty transporter 3a stops in a range in which the loader 2 can perform loading, loading work by the loader 2 is performed. The transporter 3a departs after the end of the loading work. Subsequently, after an empty transporter 3b stops in the range in which the loader 2 can perform loading, the loading work by the loader 2 is performed. The loading work is performed on the transporter 3c as well according to the same flow. Excavation loading work in a mine or the like is sequentially carried out.

Note that illustration of the transporters 3b and 3c is omitted because the transporters 3b and 3c have the same exterior as the exterior of the transporter 3a. In the following explanation, when none of the transporters 3a to 3c is selected for explanation, the transporters 3a to 3c are simply referred to as transporter(s) 3 as well.

<Loader>

Figure 2:
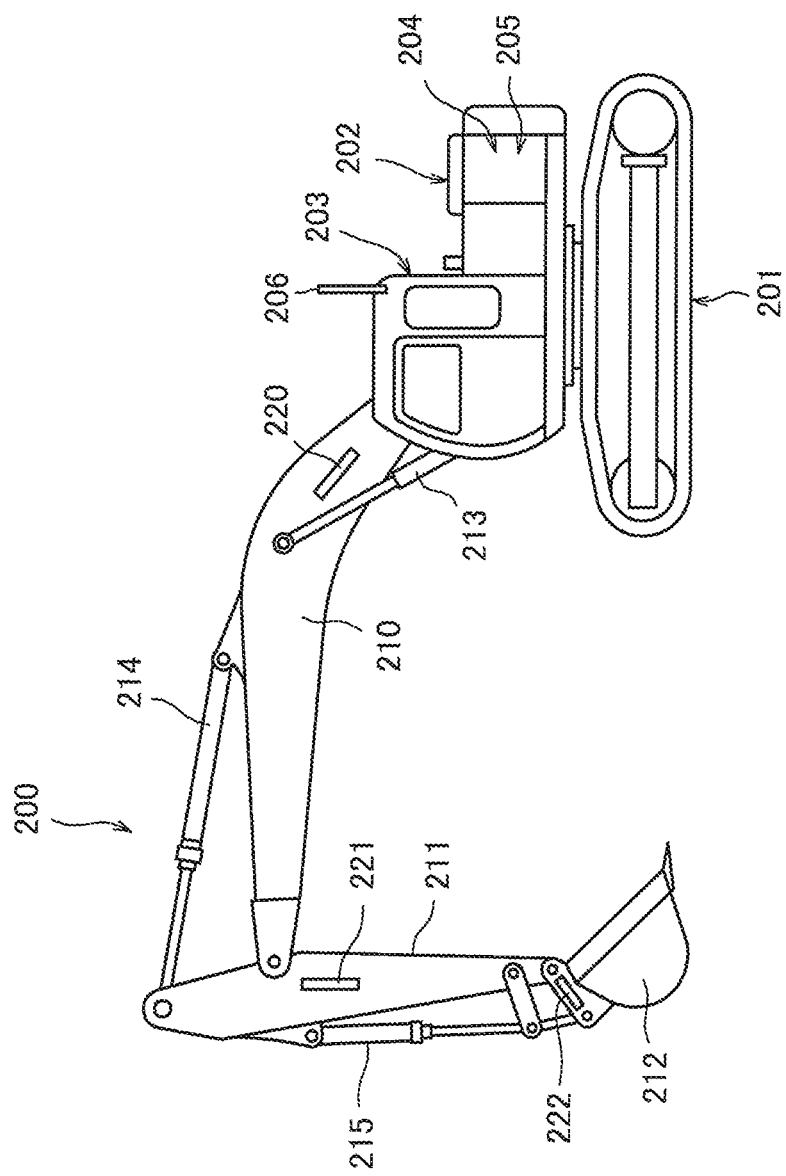
FIG. 2 is an exterior view of a loader configuring the loadage correction system in the first embodiment.

FIG. 2 is a diagram showing the exterior of the loader 2 configuring the loading correction system 1 in the first embodiment. The loader 2 includes a lower vehicle body 201 including a left traveling body and a right traveling body not shown in the figure and an upper turning body 202 turnably attached on the lower vehicle body 201. A driver's cab 203 is attached to the front of the upper turning body 202 of the loader 2. Further, a work front 200 is vertically swingably attached to the front of the upper turning body 202. A main pump 204 and a hydraulic oil tank 205 are provided in the rear of the upper turning body 202. A communication device 206 for enabling data transfer to and from other devices is provided in the driver's cab 203.

The work front 200 includes a boom 210 vertically swingably attached with respect to the upper turning body 202, an arm 211 vertically swingably attached to the boom 210, a bucket 212 vertically pivotally attached to the arm 211, a boom cylinder 213 coupled to the upper turning body 202 and the boom 210, the boom cylinder 213 swinging the boom 210 in the up-down direction, an arm cylinder 214 coupled to the boom 210 and the arm 211, the arm cylinder 214 swinging the arm 211 in the up-down direction, and a bucket cylinder 215 coupled to the arm 211 and the bucket 212, the bucket cylinder 215 causing the bucket 212 to pivot in the up-down direction.

The work front 200 includes, in order to detect a posture of the work front 200, a boom inclination sensor 220 provided in the boom 210, an arm inclination sensor 221 provided in the arm 211, and a bucket inclination sensor 222 provided in the bucket 212.

Figure 3:
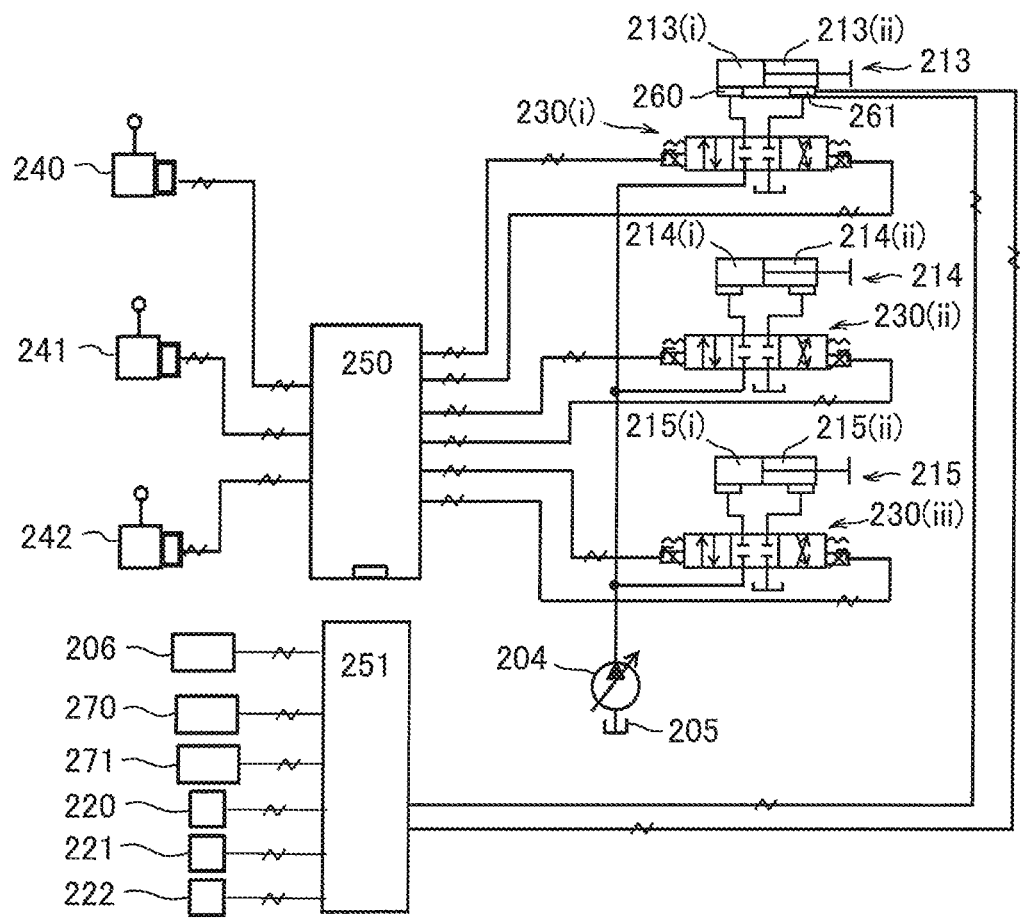
FIG. 3 is a circuit diagram showing a control circuit of the loader in the first embodiment.

FIG. 3 is a circuit diagram showing a control circuit included in the loader shown in FIG. 2. In the control circuit shown in FIG. 3, reference numeral 204 denotes a main pump driven by a not-shown engine. Pressure oil discharged from the hydraulic oil tank 205 by the main pump 204 is supplied respectively to the boom cylinder 213, the arm cylinder 214, and the bucket cylinder 215 through each of control valves 230(i) to (iii).

Operation signals generated by operating a boom operation lever 240, an arm operation lever 241, or a bucket operation lever 242 are taken into a main controller 250. The operation signals taken into the main controller 250 are used for driving for opening and closing the control valves 230(i) to (iii). Consequently, flow rates of the pressure oil supplied respectively to the boom cylinder 213, the arm cylinder 214, and the bucket cylinder 215 increase or decrease in proportion to operation amounts of the operation levers.

A boom bottom pressure sensor 260 and a boom rod pressure sensor 261 are connected to the boom cylinder 213. Measurement signals of the boom bottom pressure sensor 260 and the boom rod pressure sensor 261 are input to a weight measurement controller 251. A display monitor 270, the inclination sensors 220 to 222, the communication device 206, and a loading completion switch 271 are respectively connected to the weight measurement controller 251. The communication device 206 is used for information transmission and reception to and from the transporter 3 explained below. Note that the operation of the weight measurement controller 251 is explained below.

Driving of the cylinders is explained. When the pressure oil is supplied to a bottom-side oil chamber 213(i) of the boom cylinder 213, the boom 210 is driven to swing in the upward direction with respect to the upper turning body 202. Conversely, when the pressure oil is supplied to a rod-side oil chamber 213(ii), the boom 210 is driven to swing in the downward direction with respect to the upper turning body 202. When the pressure oil is supplied to a bottom-side oil chamber 214(i) of the arm cylinder 214, the arm 211 is driven to swing in the downward direction with respect to the boom 210. Conversely, when the pressure oil is supplied to a rod-side oil chamber 214(ii), the arm 211 is driven to swing in the upward direction with respect to the boom 210. Further, when the pressure oil is supplied to a bottom-side oil chamber 215(i) of the bucket cylinder 215, the bucket 212 is driven to pivot in the downward direction with respect to the arm 211. Conversely, when the pressure oil is supplied to a rod-side oil chamber 215(ii), the bucket 212 is driven to turn in the upward direction with respect to the arm 211.

<Transporters>

Figure 4:
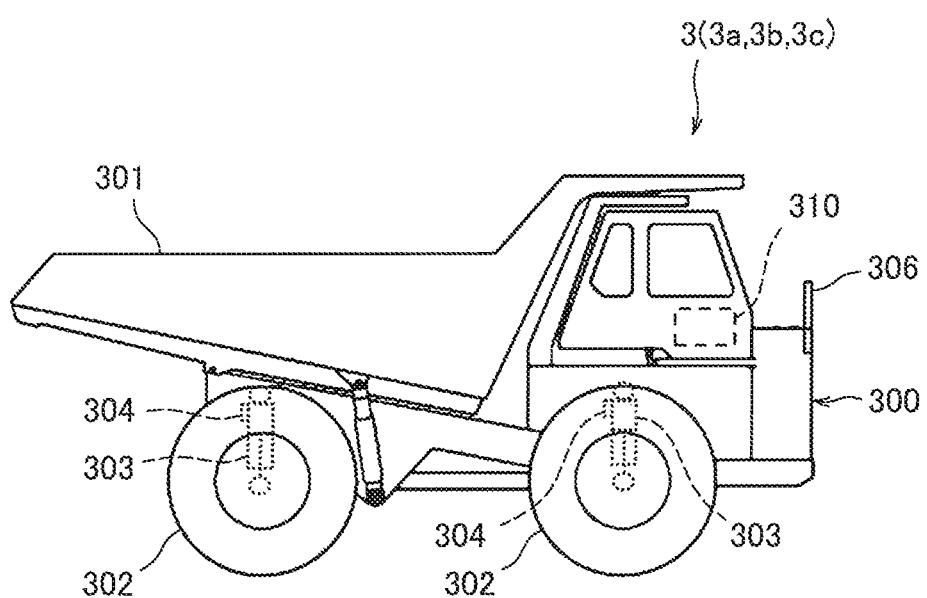
FIG. 4 is an exterior view of a transporter configuring the loadage correction system in the first embodiment.

FIG. 4 is a diagram showing the exterior of the transporters 3a, 3b, and 3c configuring the loading correction system 1 in this embodiment. The transporter 3 is capable of traveling with a loaded object, which is minerals or gravel, loaded thereon. The transporter 3 according to this embodiment includes a vehicle main body 300, a vessel 301, wheels 302, suspension cylinders 303, suspension pressure sensors 304, a communication device 306, and a weight measurement controller 310.

An engine and a traveling motor not shown in the figure are included in the vehicle main body 300 of the transporter 3. Power of the traveling motor is transmitted to the wheels 302 to enable the transporter 3 to travel. The vessel 301 is set in an upper part of the vehicle main body 300. A work object such as soil is loaded on the vessel 301 by the loader 2.

The suspension cylinders 303 of the transporter 3 are set between the wheels 302 and the vehicle main body 300. A load corresponding to a total of the weight of the vehicle main body 300, the weight of the vessel 301, and the weight of the loaded object on the vessel 301 is applied to the wheels 302 via the suspension cylinders 303. When the loaded object is loaded on the vessel 301, the suspension cylinders 303 contract and the pressure of hydraulic oil encapsulated on the insides of the suspension cylinders 303 rises. The suspension pressure sensors 304 are included in order to detect a pressure change of the hydraulic oil. Detection signals generated by the suspension pressure sensors 304 are input to the weight measurement controller 310. Note that the suspension pressure sensors 304 are set in the suspension cylinders 303 of the transporter 3. Since the transporter 3 in this embodiment includes four wheels 302, there are four suspension pressure sensors 304 in total.

The communication device 306 is connected to the weight measurement controller 310 and used for information transmission and reception to and from the loader 2. Therefore, in this embodiment, a communication unit of the loading correction system 1 that performs various kinds of data transfer is configured by the communication device 306 of the transporter 3 and the communication device 206 of the loader 2. Note that the operation of the weight measurement controller 310 is explained below.

<Internal Configurations of the Weight Measurement Controllers>

Figure 5:
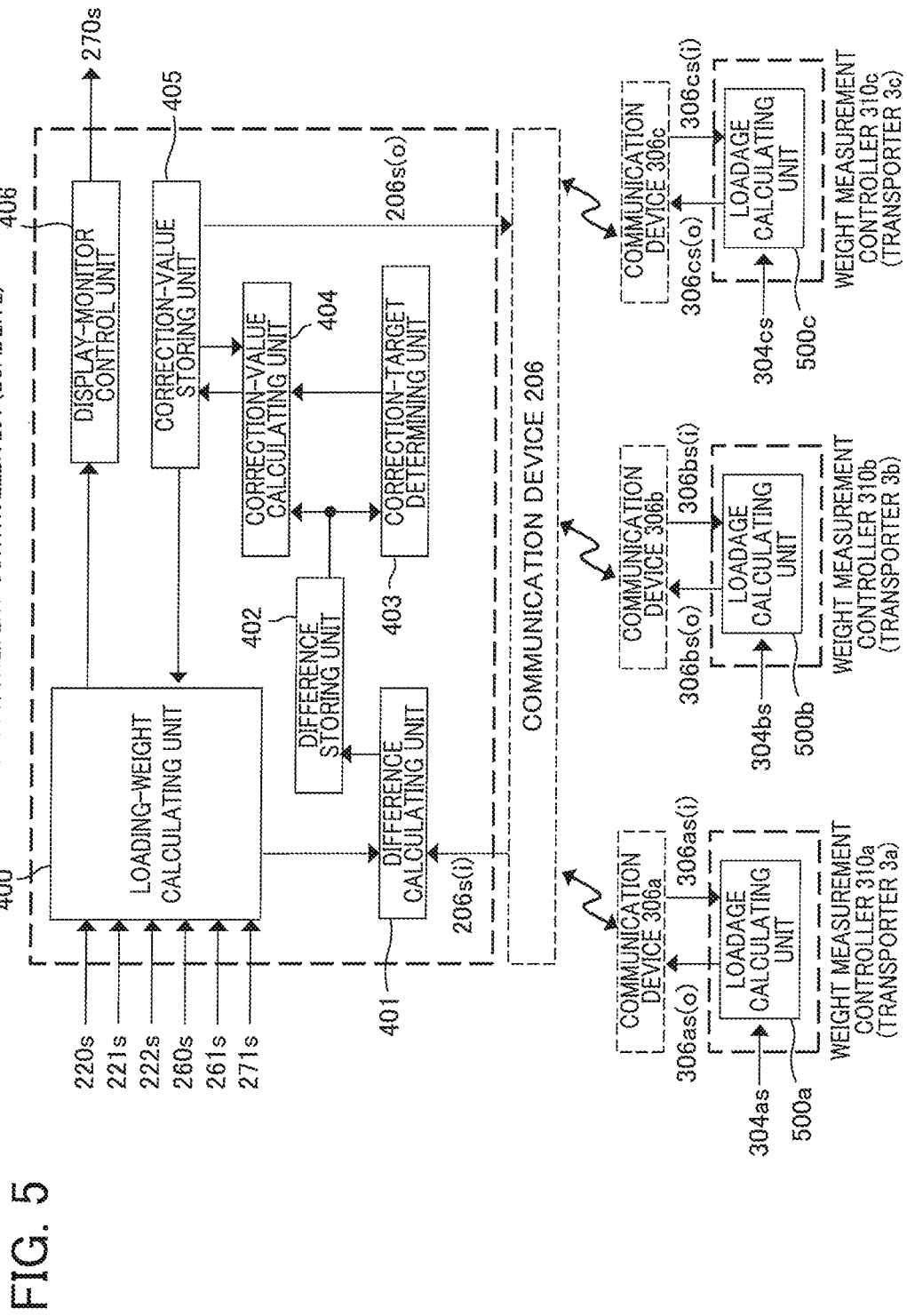
FIG. 5 is a block diagram related to internal configurations of weight measurement controllers in the first embodiment.

Internal configurations of the weight measurement controller 251 and the weight measurement controller 310 are explained with reference to FIG. 5. FIG. 5 is a block diagram related to internal configurations of the weight measurement controllers according to the first embodiment.

A boom inclination sensor signal 220s, an arm inclination sensor signal 221s, a bucket inclination sensor signal 222s, a boom bottom pressure sensor signal 260s, a boom rod pressure sensor signal 261s, a loading completion switch signal 271s, and a communication signal 206s(i) from the weight measurement controllers 310 via the communication device 206 are input to the weight measurement controller 251. Output signals from the weight measurement controller 251 are a display monitor signal 270s and a communication signal 206s(o) to the weight measurement controller 310 via the communication device 206.

On the other hand, a suspension pressure sensor signal 304as and a communication signal 306as(i) from the weight measurement controller 251 via the communication device 306 are input to a weight measurement controller 310a of the transporter 3a. An output signal from the weight measurement controller 310a is a communication signal 306as(o) to the weight measurement controller 251 via a communication device 306a.

Note that a weight measurement controller 310b of the transporter 3b and a weight measurement controller 310c of the transporter 3*c* have the same configuration as the configuration of the weight measurement controller 310*a*. Therefore, components of the weight measurement controller 310*b* and the weight measurement controller 310*c* are denoted by the same reference numerals and signs in FIG. 5 and explanation of the components is omitted. When none of the weight measurement controllers 310*a* to 310*c* is selected for explanation, the weight measurement controllers 310*a* to 310*c* are simply referred to as weight measurement controller(s) 310 as well. Further, when none of loadage calculating units 500*a* to 500*c* is selected for explanation, the loadage calculating units 500*a* to 500*c* are simply referred to as loadage calculating unit(s) 500 as well. When none of communication devices 306*a* to 306*c* is selected for explanation, the communication devices 306*a* to 306*c* are simply referred to as communication device(s) 306 as well.

The loadage calculating unit 500 that calculates weight of an work object loaded on the vessel 301 is provided on the inside of the weight measurement controller 310 of each transporter 3. That is, the loadage calculating unit 500 corresponds to a loadage measuring unit that measures loadage of a work object loaded in each transporter 3 from the loader 2.

On the other hand, the inside of the weight measurement controller 251 is configured by a loading-weight calculating unit 400 that calculates weight of a work object transported by the work front 200, a difference calculating unit 401 that calculates a difference between calculation results of the loading-weight calculating unit 400 and the loadage calculating unit 500 in the weight measurement controller 310, a difference storing unit 402 that stores a difference calculation result, a correction-target determining unit 403 that determines a device, a calculation result of which needs to be corrected, from the loading-weight calculating unit 400 and the loadage calculating units 500*a* to 500*c*, a correction-value calculating unit 404 that calculates a correction value for a correction target, a correction-value storing unit 405 that stores the correction value, and a display-monitor control unit 406 that generates the display monitor signal 270*s*. According to such a configuration of the weight measurement controller 251, the loading-weight calculating unit 400 is set in the loader 2 as a loading-weight measuring unit that measures a loading weight of a work object loaded by the loader 2.

Note that the weight measurement controller 251 and the weight measurement controller 310 are configured to repeatedly execute a series of input and output at a preset control cycle. For example, in the weight measurement controller 251, each of the loading-weight calculating unit 400, the difference calculating unit 401, the correction-target determining unit 403, the correction-value calculating unit 404, and the display-monitor control unit 406 is configured from a known CPU. Various programs are executed by the CPU, whereby processing in the units is executed. The difference storing unit 402 and the correction-value storing unit 405 may be configured from a known storage device such as RAM or a hard disk. Various data are written in the storage device, whereby the series of input and output explained above may be repeatedly executed. The weight measurement controller 251 may be configured as a CPU that executes processing of one program for repeatedly executing the series of input and output explained above.

<Overall Processing Flow of the Weight Measurement Controllers>

Figure 6:
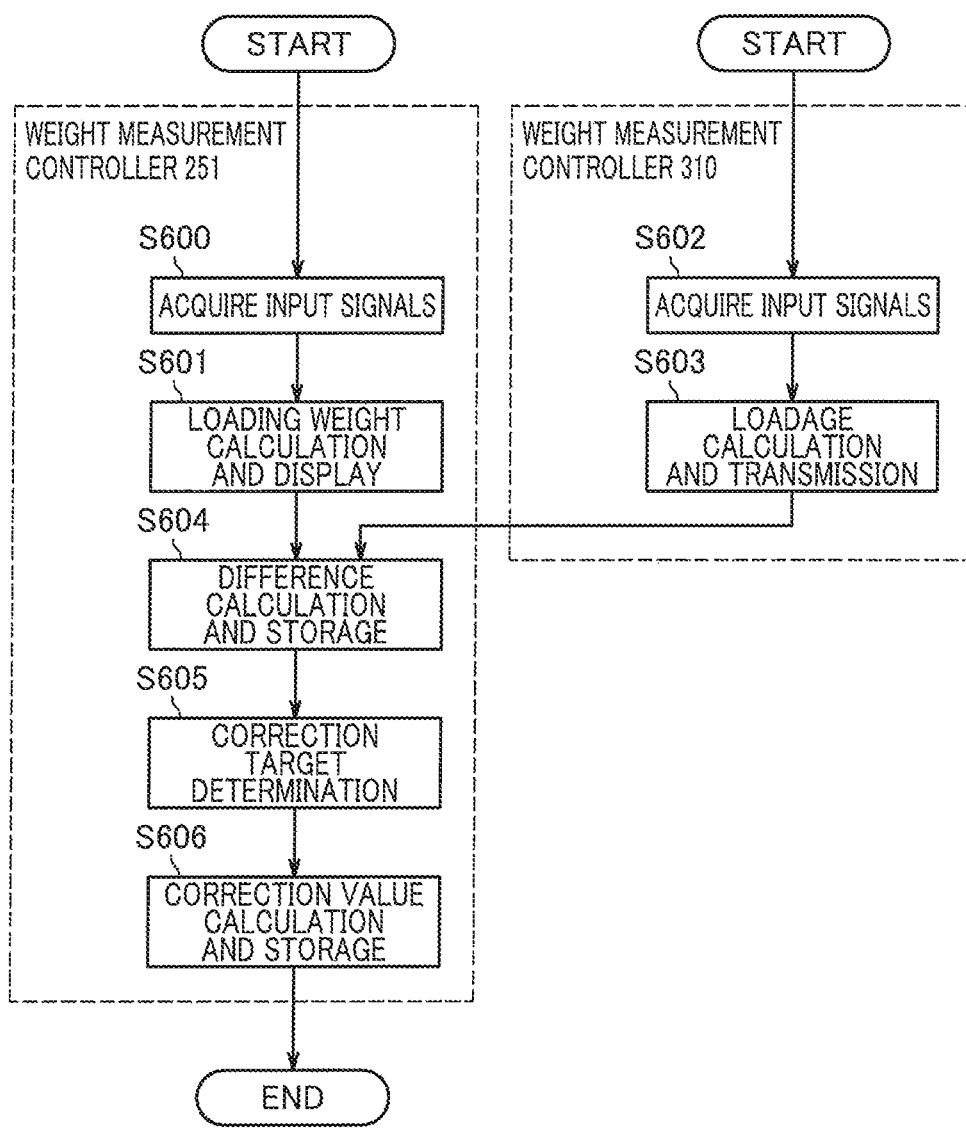
FIG. 6 is an overall processing flowchart of the weight measurement controllers in the first embodiment.

An overall processing flow of the weight measurement controller 251 and the weight measurement controller 310 is shown in FIG. 6. FIG. 6 is a flowchart related to the overall processing flow of the weight measurement controllers in the first embodiment. In the overall processing flow in FIG. 6, steps S600, S601, and S604 to S606 are processing performed on the weight measurement controller 251 side of the loader 2. Steps S602 and S603 are processing performed on the weight measurement controller side of the transporter 3.

First, in step S600, acquisition of the input signals explained above is performed in the weight measurement controller 251 of the loader 2. In step S601, loading weight calculation by the loading-weight calculating unit 400 and generation of the display monitor signal 270*s* by the display-monitor control unit 406 are performed. On the other hand, in step S602, acquisition of the input signals explained above is performed in the weight measurement controller 310 of the transporter 3. In step S603, calculation of loadage by the loadage calculating unit 500 and transmission of a loadage calculation result to the weight measurement controller 251 via the communication device 306 are performed.

Subsequently, in step S604, difference calculation by the difference calculating unit 401 and storage of a difference calculation result in the difference storing unit 402 is performed. Subsequently, in step S605, determination of a correction target by the correction-target determining unit 403 is performed. Thereafter, in step S606, correction value calculation by the correction-value calculating unit 404 and storage of a correction value in the correction-value storing unit 405 are performed. Details of the steps are explained below.

«Step S601: Loading-Weight Calculation/Display»

Figure 7:
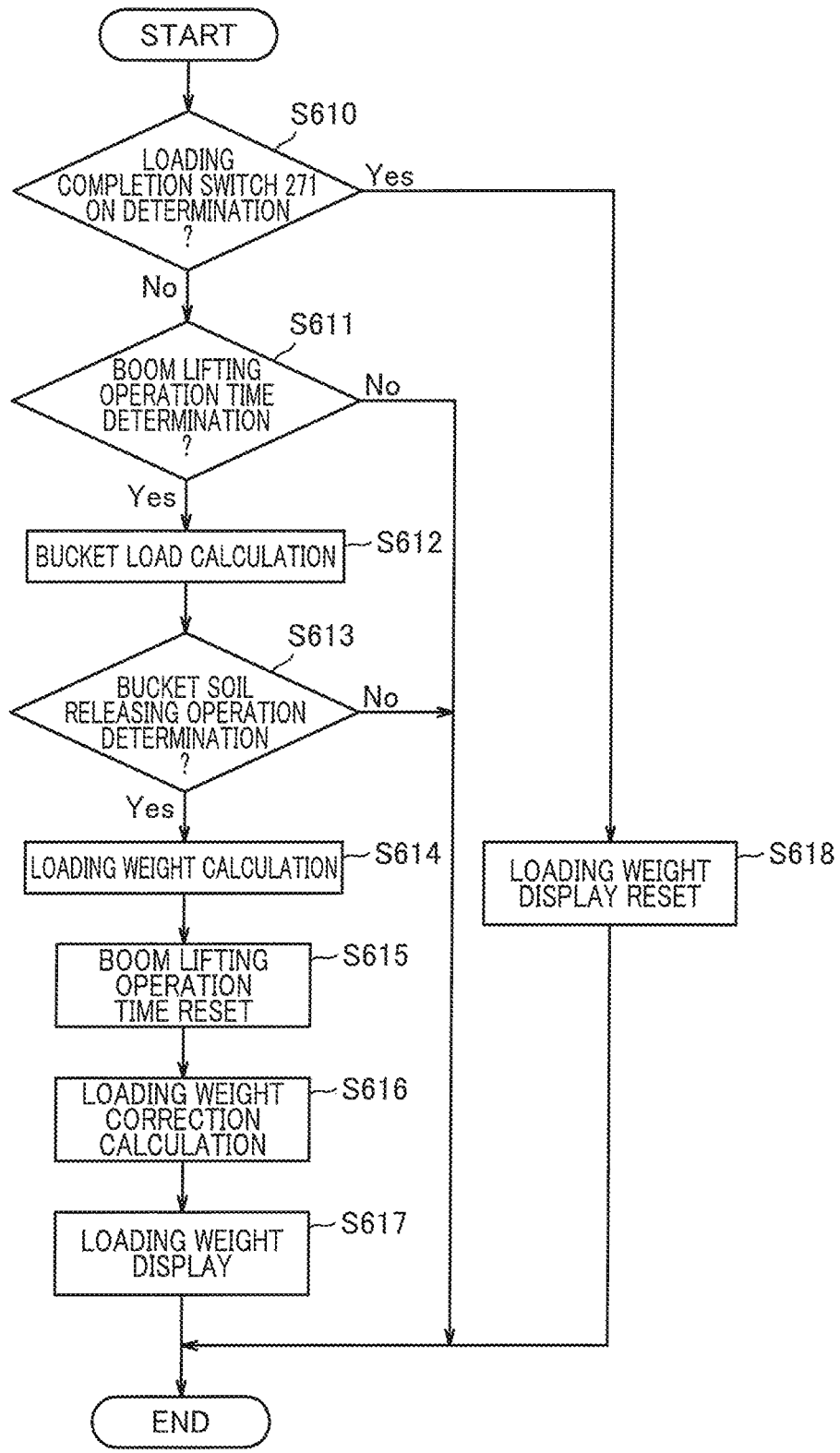
FIG. 7 is a control flowchart of loading weight calculation/display in the first embodiment.
Figure 8:
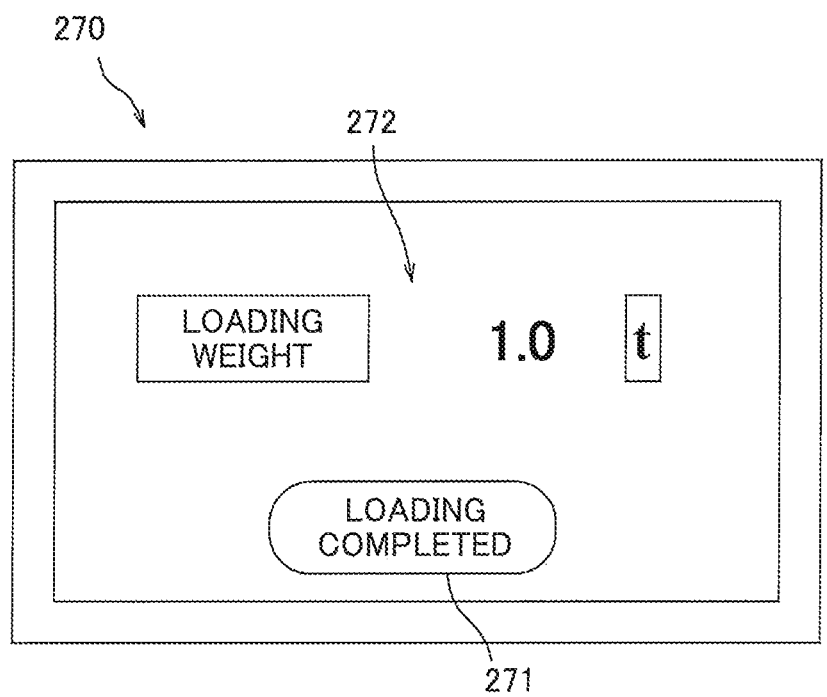
FIG. 8 is an exterior view of a display monitor in the first embodiment.
Figure 9:
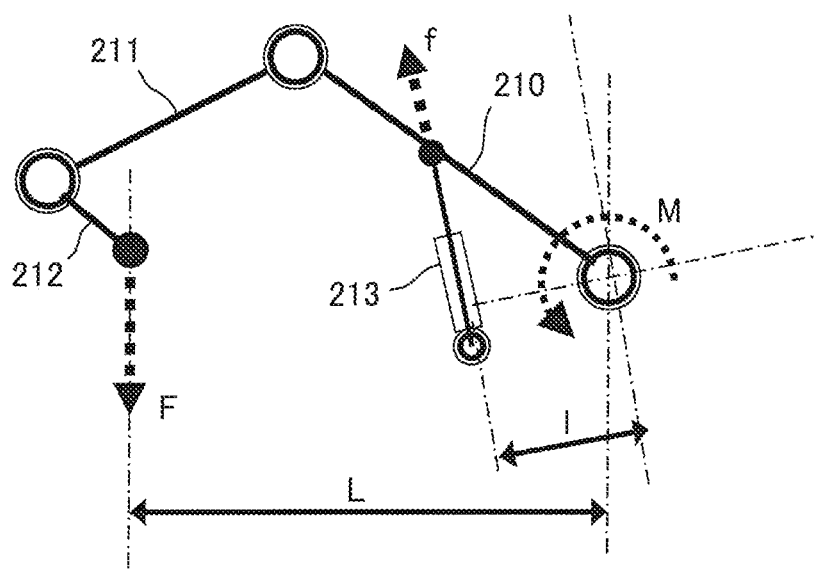
FIG. 9 is a diagram for explaining an arithmetic algorithm of loading weight calculation in the first embodiment.

The loading-weight calculation/display in step S601 is explained in detail with reference to FIG. 7, FIG. 8, and FIG. 9. FIG. 7 shows a subroutine of step S601. FIG. 8 shows the exterior of the display monitor 270 in this embodiment. FIG. 9 is a schematic diagram for explaining an arithmetic algorithm of loading weight calculation.

In step S610 in FIG. 7, ON/OFF determination of the loading completion switch 271 is performed. The loading completion switch 271 is attached to the display monitor 270 shown in FIG. 8. The loading completion switch 271 is pressed by an operator of the loader 2 when loading work on one transporter 3 is completed. When the loading completion switch 271 is OFF, the processing shifts to step S611. When the loading completion switch 271 is ON, the processing shifts to step S618.

In step S611, boom lifting operation time determination is performed. When driving operation in the upward direction for the upper turning body 202 of the boom 210 is continuously performed by a predetermined value decided in advance or more, the processing shifts to step S612. For example, when the predetermined value is set to five seconds and the boom inclination sensor signal 220*s* continuously fluctuates in a boom lifting direction for five seconds or more, the processing shifts to step S612. Note that the predetermined value may be changed as appropriate according to dimensions of the loader 2. For a loader having a relatively small size, since movement of the boom is quick, the predetermined value may be set to 0.5 second.

In step S612, an amount of soil in the bucket 212 excavated by the operation of the work front 200 is calculated. That is, bucket load calculation processing is performed. FIG. 9 is a schematic diagram related to bucket load calculation. A bucket load F is calculated by solving a balance expression of a moment M in a boom pivoting center. The moment M generated according to the bucket load F is represented by $M = F \cdot L$ using a load point and a horizontal distance L in the boom pivoting center. On the other hand, the moment M generated according to thrust f of the boom cylinder 213 is represented by M=f·l using a horizontal distance l to the boom pivoting center. The horizontal distances L and l can be easily calculated using detection values of the inclination sensors 220 to 222. The thrust f can be easily calculated using detection values of the boom bottom pressure sensor 260 and the boom rod pressure sensor 261. Consequently, the bucket load F, which is an unknown number, is derived by F=f·l/L.

In step S613, it is determined by monitoring of the bucket inclination sensor signal 222s whether the bucket 212 is driven to pivot in the upward direction with respect to the arm 211. That is, bucket soil dropping operation determination is performed. When the bucket inclination sensor signal 222s fluctuates in a bucket soil releasing direction, the processing shifts to step S614.

In step S614, loading weight calculation is performed. Specifically, processing for integrating a bucket load, which is a calculation result of step S612, with a present loading weight is performed. Subsequently, in step S615, processing for resetting the boom lifting operation time is performed.

In general, a hydraulic shovel, a work tool of which is a bucket, such as the loader 2 carries out work by repeating a cycle of excavating, boom lift turning, and soil releasing. It is possible to calculate a total of loading weights with the processing in steps S611 to S615, which are steps for detecting boom lifting operation and bucket releasing operation in a predetermined time.

Subsequently, in step S616, correction calculation of a loading weight is performed. Processing for reading a correction value stored in a correction-value storing unit 405 explained below and adding the correction value to a loading weight, which is a calculation result of step S614, is performed. Thereafter, in step S617, generation of the display monitor signal 270s by the display-monitor control unit 406 is performed. The loading weight corrected by the processing in step S616 is displayed on a loading-weight display unit 272 shown in FIG. 8 by this processing.

On the other hand, in step S618, loading weight display reset processing for resetting a display value of the loading-weight display unit 272 to zero is performed.

The processing by step S617 or step S618 explained above is performed, whereby the processing related to the loading weight calculation/display in step S601 ends. The various kinds of processing concerning the determination, the calculation, and the reset explained above is executed by the loading-weight calculating unit 400 because various data concerning the processing are input to the loading-weight calculating unit 400 of the weight measurement controller 251.

«Step S603: Loadage Calculation/Transmission»

Figure 10:
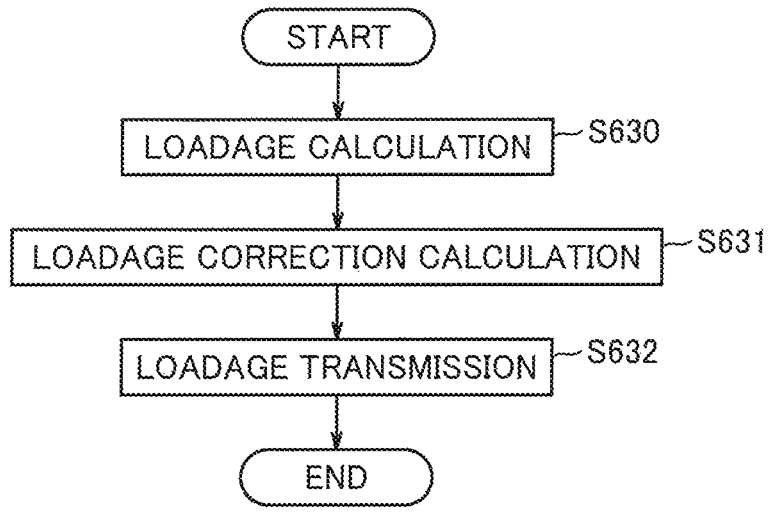
FIG. 10 is a control flowchart of loadage calculation in the first embodiment.
Figure 11:
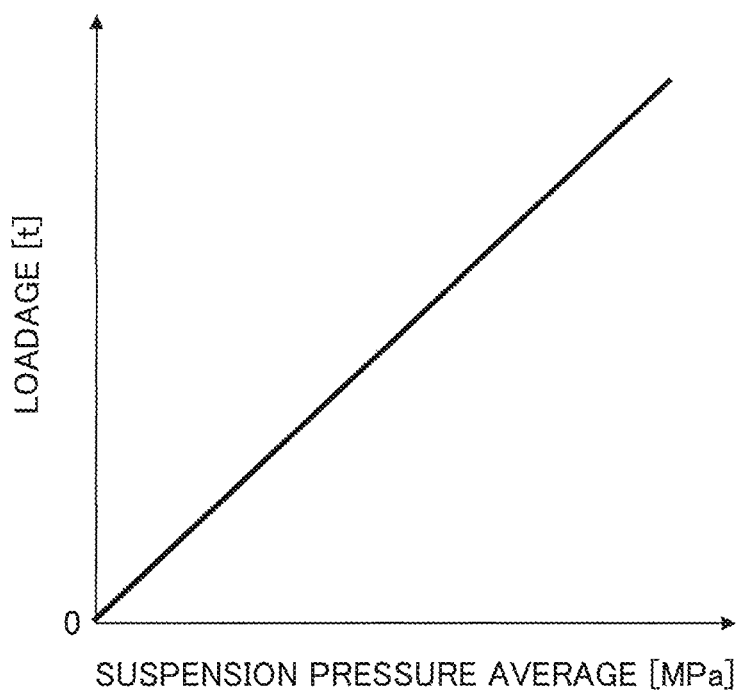
FIG. 11 is a diagram for explaining an arithmetic algorithm of the loadage calculation in the first embodiment.

The loadage calculation/transmission in step S603 is explained in detail with reference to FIG. 10 and FIG. 11. FIG. 10 shows a subroutine of step S603. FIG. 11 is a graph showing a relation between a suspension pressure average and loadage for explaining the arithmetic algorithm of loadage calculation.

Loadage calculation is performed in step S630 in FIG. 10. Specifically, loadage is converted and calculated from detection values of the suspension pressure sensors 304. A correspondence relation between a suspension pressure and loadage is decided in advance in the weight measurement controller 310 as shown in FIG. 11. As explained above, the transporter 3 in this embodiment includes the four wheels 302. There are four suspension pressure sensors 304 in total in one transporter. The horizontal axis of FIG. 11 indicates an average (MPa) of detection values of the suspension pressure sensors 304 and the vertical axis of FIG. 11 indicates loadage (t).

Subsequently, in step S631, correction calculation for the loadage is performed. Processing for reading a correction value stored in the correction-value storing unit 405 explained below via the communication device 306 and adding the correction amount to the loadage, which is a calculation result of step S630, is performed. Note that, since various data concerning the processing are input to the loadage calculating unit 500 of the weight measurement controller 310, step S630 concerning the loadage calculation and step S631 concerning the correction calculation are executed by the loadage calculating unit 500.

Subsequently, in step S632, processing for transmitting a calculation result of step S631 to the weight measurement controller 251 via the communication device 306 is performed. The processing of the transmission of the loadage by step S632 is performed, whereby the processing related to the loadage calculation/transmission in step S603 ends.

«Step S604: Difference Calculation/Storage»

Figure 12:
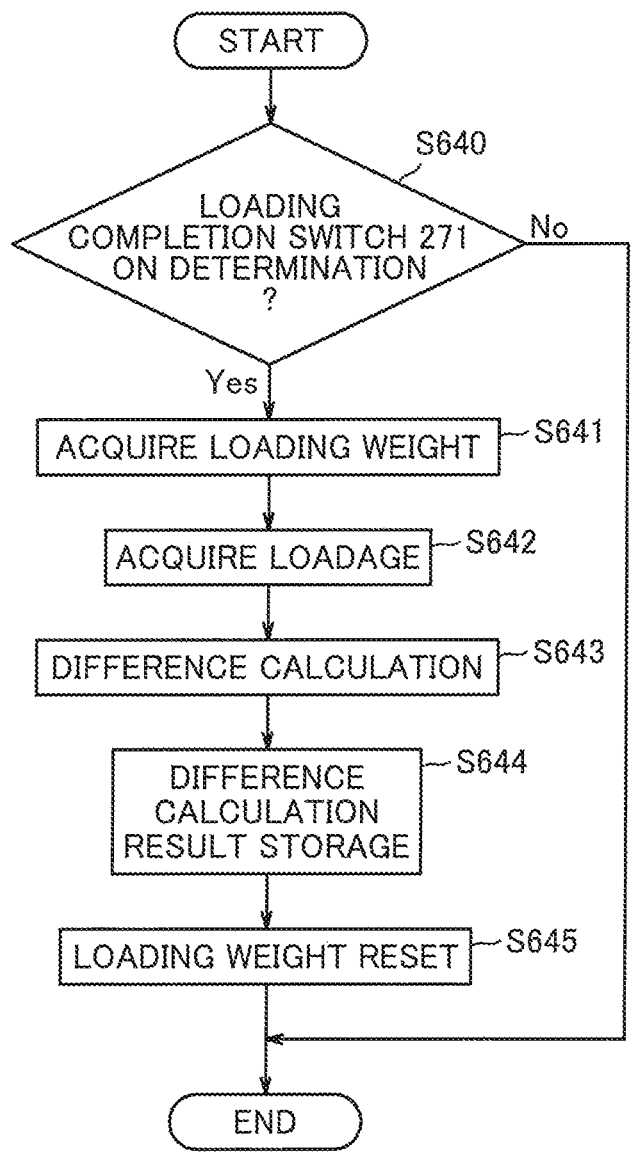
FIG. 12 is a control flowchart of difference calculation/storage in the first embodiment.
Figure 13:
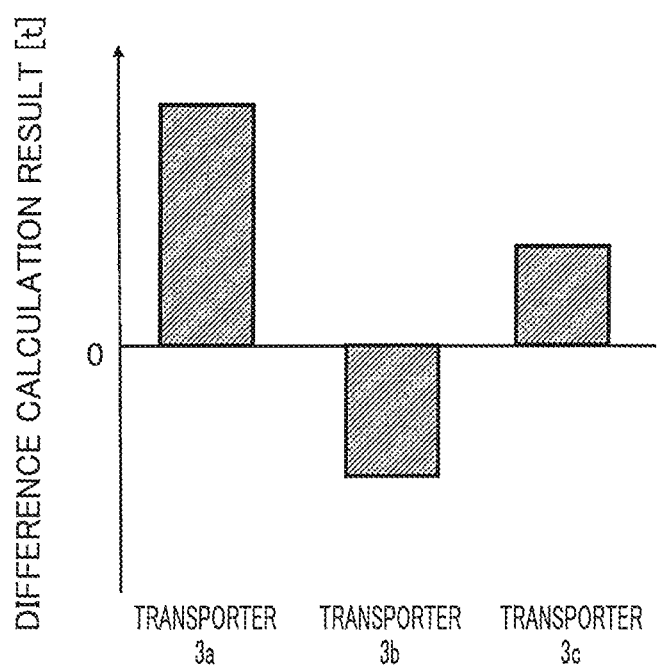
FIG. 13 is a diagram showing forms of the difference calculation/storage in the first embodiment.

The difference calculation/storage in step S604 is explained in detail with reference to FIG. 12 and FIG. 13. FIG. 12 shows a subroutine of step S604. FIG. 13 is a schematic diagram concerning storage of a difference calculation result.

In step S640 in FIG. 12, ON/OFF determination of the loading completion switch 271 is performed. Explanation of processing in step S640 is omitted because the processing is the same as the processing in step S610. When the loading completion switch 271 is ON, the processing shifts to step S641. On the other hand, when the loading completion switch 271 is OFF, the processing related to the difference calculation/storage in step S604 ends.

In step S641, loading weigh information after correction, which is a calculation result of step S616 in FIG. 7, is acquired. Specifically, the loading weight information after correction is directly input from the loading-weight calculating unit 400 to the difference calculating unit 401. Subsequently, in step S642, loadage information after correction, which is a processing result of step S632 in FIG. 10, is acquired. Specifically, data transfer by the communication device 206 and the communication device 306 is performed. Loadage information after correction calculated by the loadage calculating unit 500 is input to the difference calculating unit 401.

In step S643, calculation of a difference between the loading weight acquired in step S641 and the loadage acquired in step S642 is performed in the difference calculating unit 401. Specifically, when a loading weight of the loader 2 is represented as W and loadage of the transporter 3a is represented as Wa, a difference is calculated by (W−Wa). Similarly, in difference calculation processing concerning the other transporters, when loadage of the transporter 3b is represented as Wb, the difference is calculated by (W−Wb) and, when the loadage of the transporter 3c is represented as Wc, the difference is calculated by (W−Wc).

In step S644, storage processing of a difference calculation result in the difference storing unit 402 is performed. As shown in FIG. 13, difference calculation results for the respective transporters are respectively stored in the difference storing unit 402. In FIG. 13, an example of a store difference calculation result is shown. Difference calculation results related to the transporter 3a and the transporter 3c are positive values and a difference calculation result related to the transporter 3b is a negative value. That is, as a result, loadages (Wa, Wc) after correction respectively calculated in the transporter 3a and the transporter 3c are smaller than loading weights (W) after correction for the transporters calculated in the loader 2. On the other hand, as a result, loadage (Wb) after correction calculated in the transporter 3b is larger than a loading weight (W) after correction for the transporter 3b calculated in the loader 2.

In step S645, loading weight reset processing for resetting the loading weight, which is the calculation result of step S614 in FIG. 7, to zero is performed. The loading weight reset processing by step S645 is performed, whereby the processing related to the difference calculation/storage in step S604 ends.

«Step S605: Correction Target Determination»

Figure 14:
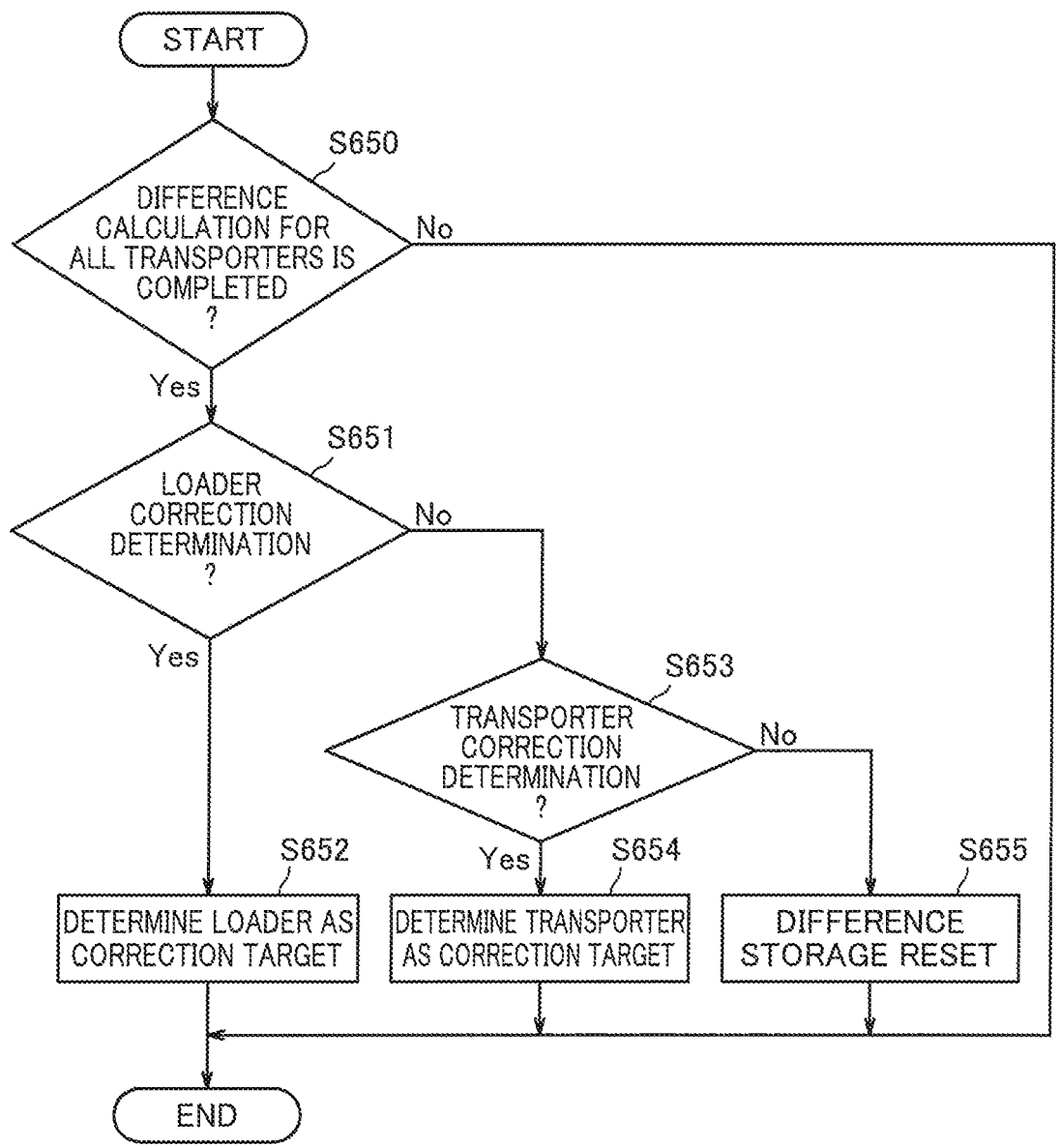
FIG. 14 is a control flowchart of correction target determination in the first embodiment.
Figure 15:
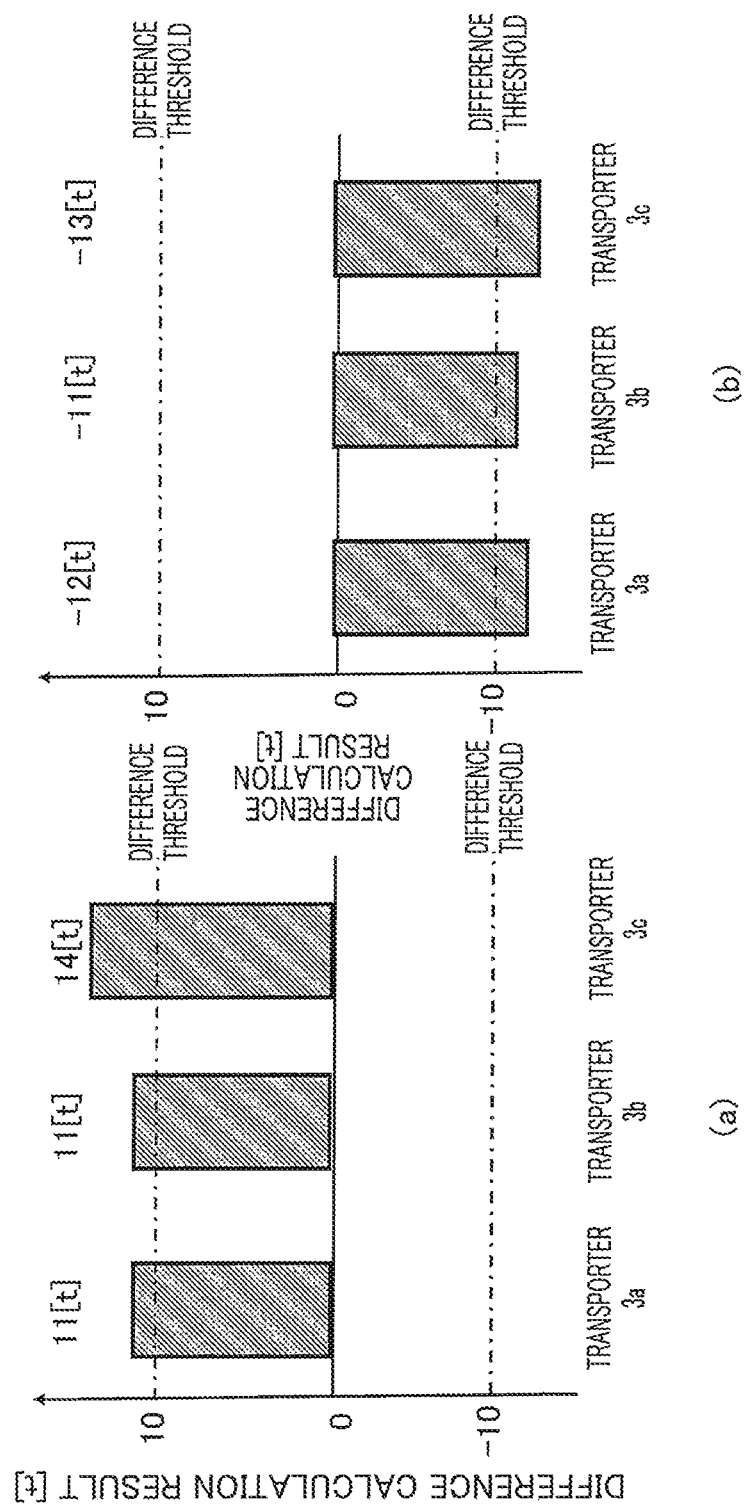
FIG. 15 is a diagram showing forms of the correction target determination in the first embodiment.
Figure 16:
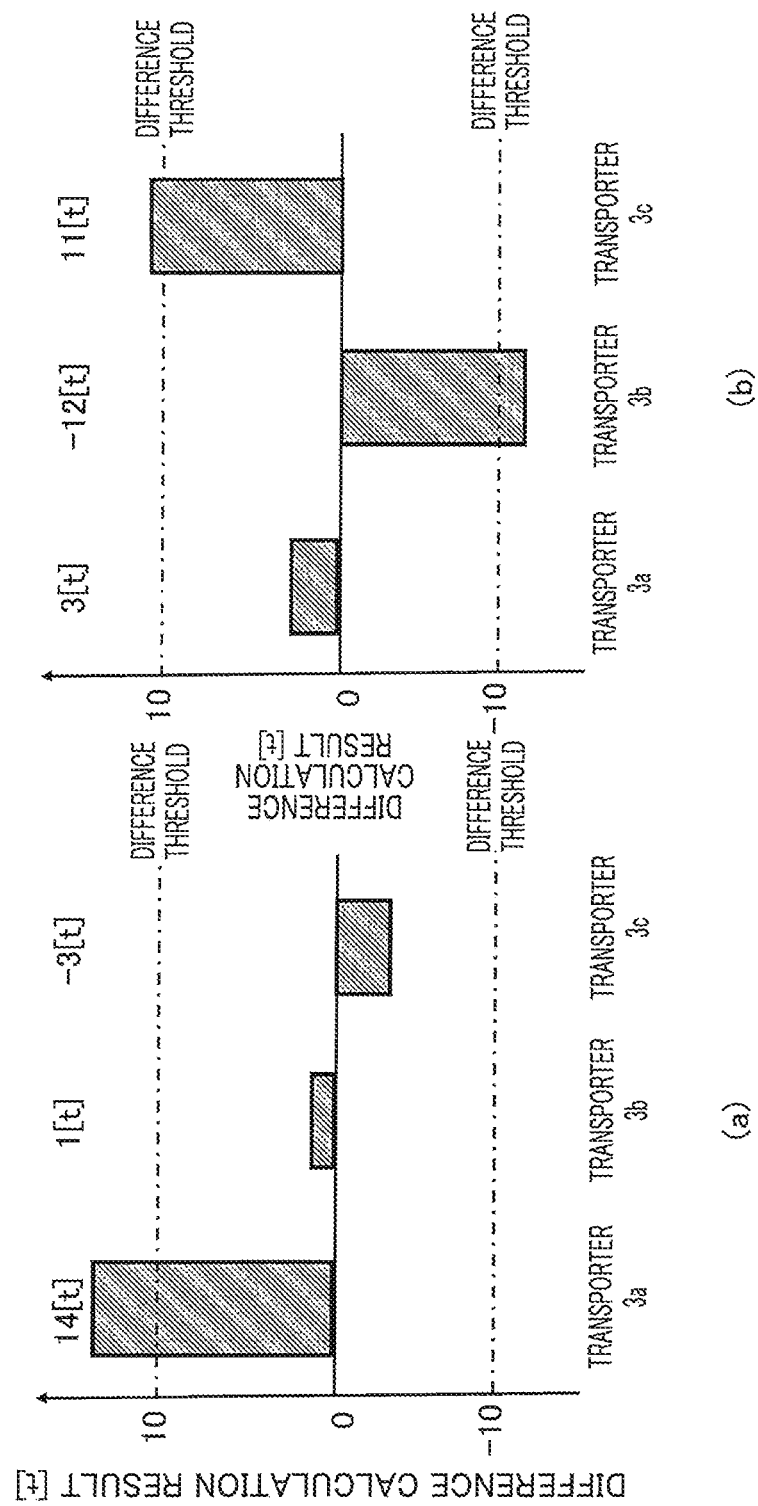
FIG. 16 is a diagram showing forms of the correction target determination in the first embodiment.

The correction target determination in step S605 is explained in detail with reference to FIG. 14, FIG. 15, and FIG. 16. FIG. 14 shows a subroutine of step S605. FIG. 15 is a schematic diagram concerning correction determination for the loader. FIG. 16 is a schematic diagram concerning correction determination for the transporters.

In step S650 in FIG. 14, it is determined whether the difference calculation for all the transporters is completed. When loading work on the transporter 3a by the loader 2 is completed, the processing in step S644 is performed according to the flow of FIG. 12. A difference calculation result (W−Wa) is stored in the difference storing unit 402. Subsequently, when loading work on the transporter 3b by the loader 2 is completed, similarly, a difference calculation result (W−Wb) is stored in the difference storing unit 402. Further, when loading work on the transporter 3c by the loader 2 is completed, similarly, a difference calculation result (W−Wc) is stored in the difference storing unit 402. In this embodiment, determination for regarding, referring to the difference storing unit 402, the difference calculation for all the transporters is completed when the difference calculation result of the transporter 3c is stored. Note that, since the correction-target determining unit 403 refers to the data stored in the difference storing unit 402, this determination processing is executed by the correction-target determining unit 403.

When the determination in step S650 is affirmed, the processing shifts to step S651. On the other hand, when it is determined that the difference calculation for all the transporters is not completed, that is, the determination in step S650 is negated, the processing related to the correction target determination in step S605 ends.

In step S651, loader correction determination is performed. In the correction-target determining unit 403, as shown in FIG. 15, a threshold (a difference threshold) for a difference calculation result is set in advance. That is, in this embodiment, the correction-target determining unit 403 also functions as a threshold setting unit capable of setting a threshold for a difference calculation result stored in the difference storing unit 402. In this embodiment, for convenience, the difference threshold is set to 10 [t]. As shown in FIG. 15(a) and FIG. 15(b), when difference calculation results of all the transporters (transporters 3a to 3c) exceed the difference threshold in the same direction, the processing shifts to step S652, where the loading-weight calculating unit 400 of the loader 2 is determined as a correction target. In other words, when difference calculation results (in this embodiment, three difference calculation results W−Wa, W−Wb, and W−Wc) of all combinations of respective measurement results of the loader 2 and the transporters 3a to 3c (in this embodiment, three sets of the loader 2 and the transporter 3a, the loader 2 and the transporter 3b, and the loader 2 and the transporter 3c) have the same sign and each of the difference calculation results exceeds the difference threshold, the loading-weight calculating unit 400 of the loader 2 is determined as a correction target. Note that, in FIG. 15(a), the difference calculation results of all the transporters exceed a difference threshold on a plus side. In FIG. 15(b), the difference calculation results of all the transporters exceed a difference threshold on a minus side.

In step S653, transporter correction determination is performed. As shown in FIG. 16(a) and FIG. 16(b), when the difference calculation results of any one or more transporters exceed the difference threshold (not including the case in which the difference calculation results of all the transporters exceed the difference threshold in the same direction), the processing shifts to step S654, where the transporters are determined as correction targets. Specifically, in the case of FIG. 16(a), the loadage calculating unit 500a of the transporter 3a is determined as a correction target. In the case of FIG. 16(b), the loadage calculating unit 500b of the transporter 3b and the loadage calculating unit 500c of the transporter 3c are determined as correction targets.

In step S655, difference storage reset processing for resetting (clearing) the difference calculation result stored in the difference storing unit 402 is performed. When a correction target is not selected (it is determined that correction is unnecessary) in a situation in which the difference calculation for all the transporters is completed, the difference calculation result stored in the difference storing unit 402 is reset.

The processing by step S652, step S654, and step S655 explained above ends, whereby the processing related to the correction target determination in step S605 ends.

«Step S606: Correction Value Calculation/Storage»

Figure 17:
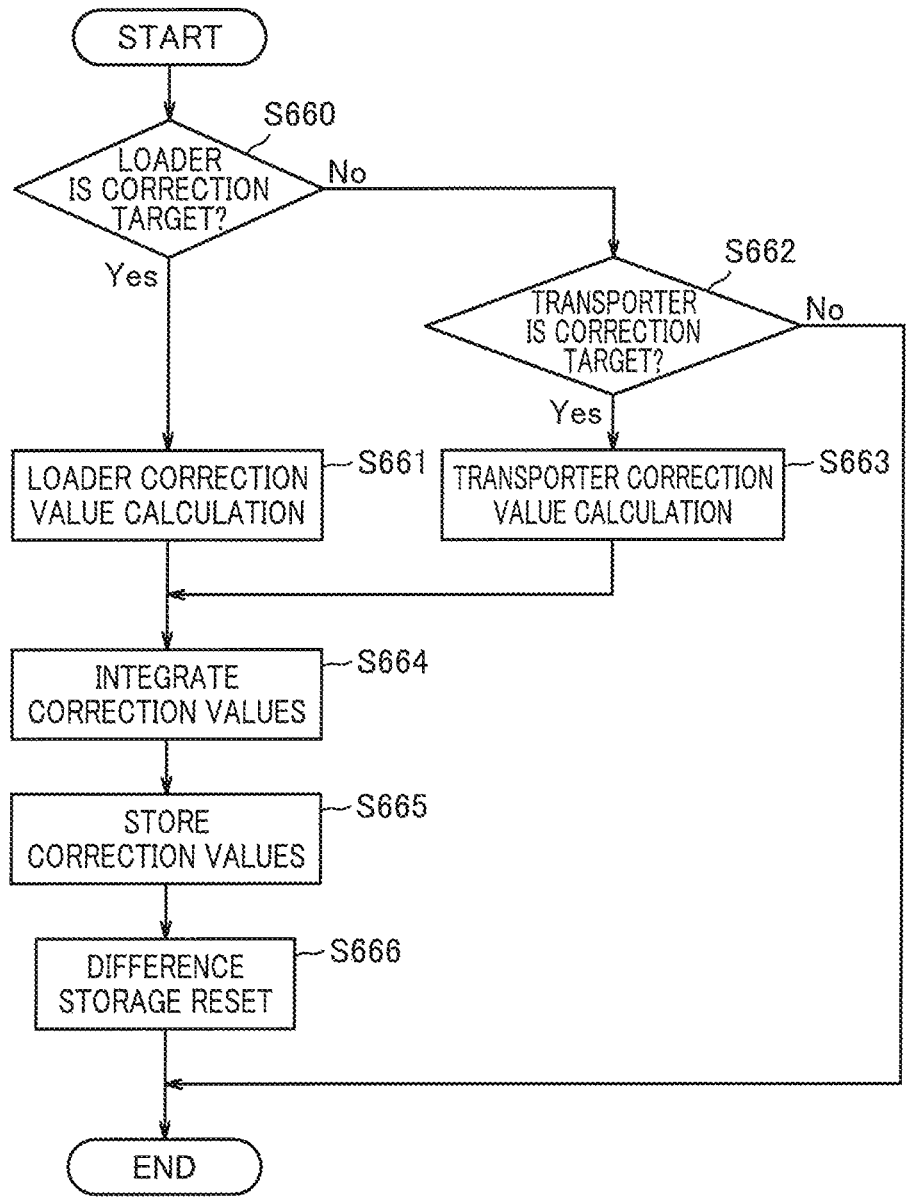
FIG. 17 is a control flowchart of correction value calculation/storage in the first embodiment.
Figure 18:
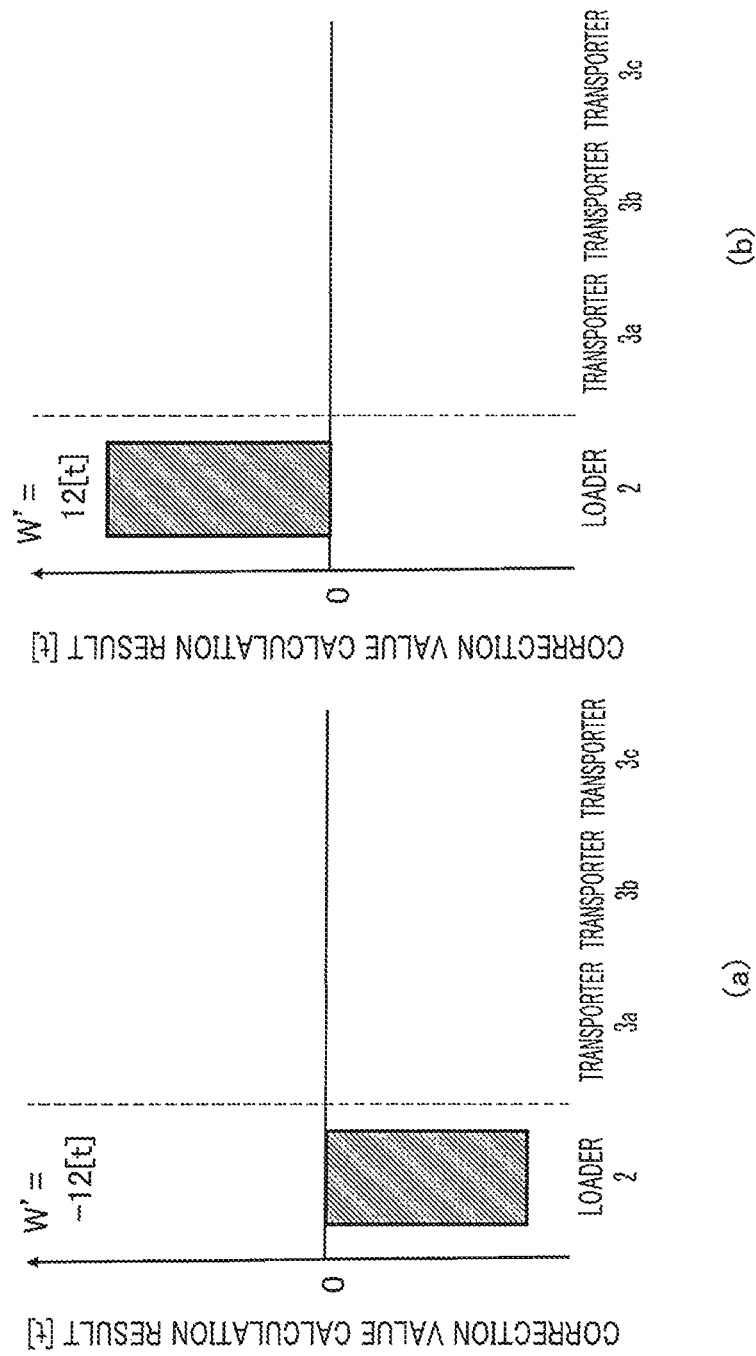
FIG. 18 is a diagram showing forms of the correction value calculation/storage in the first embodiment.
Figure 19:
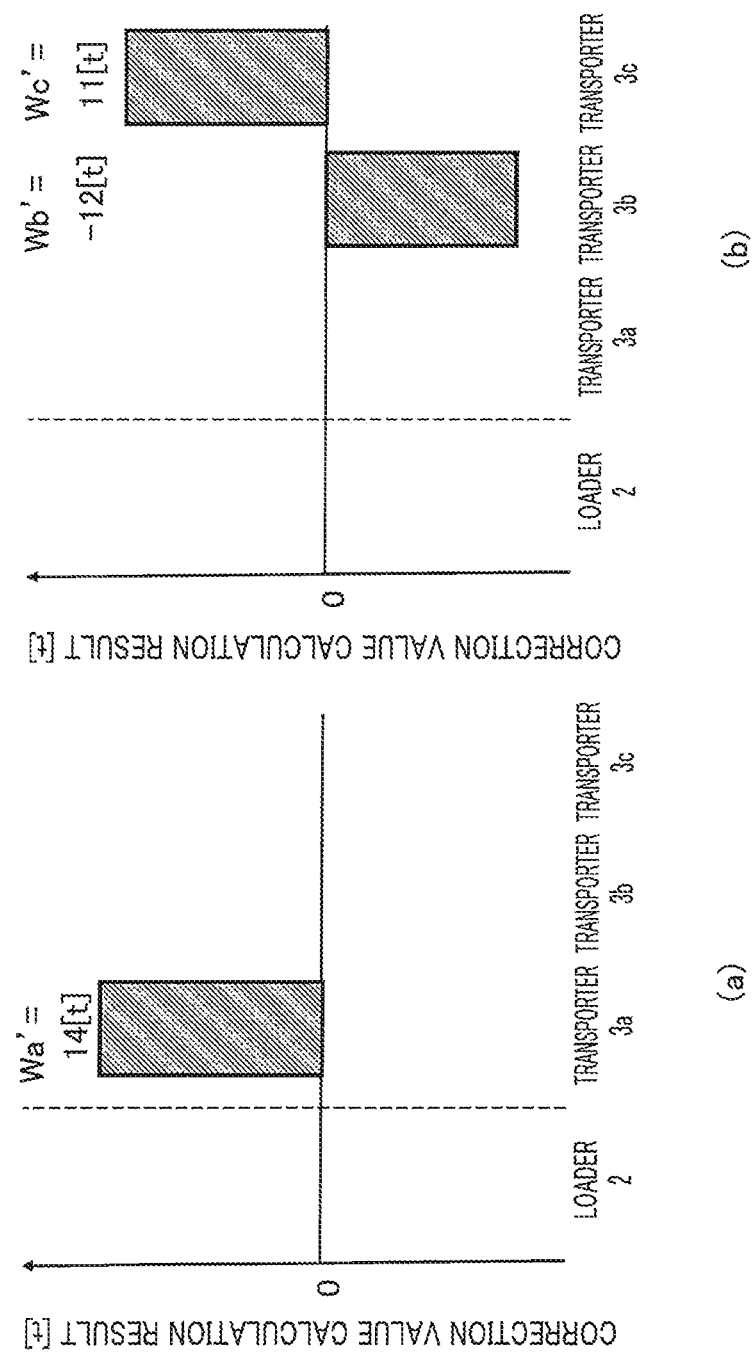
FIG. 19 is a diagram showing forms of the correction value calculation/storage in the first embodiment.
Figure 20:
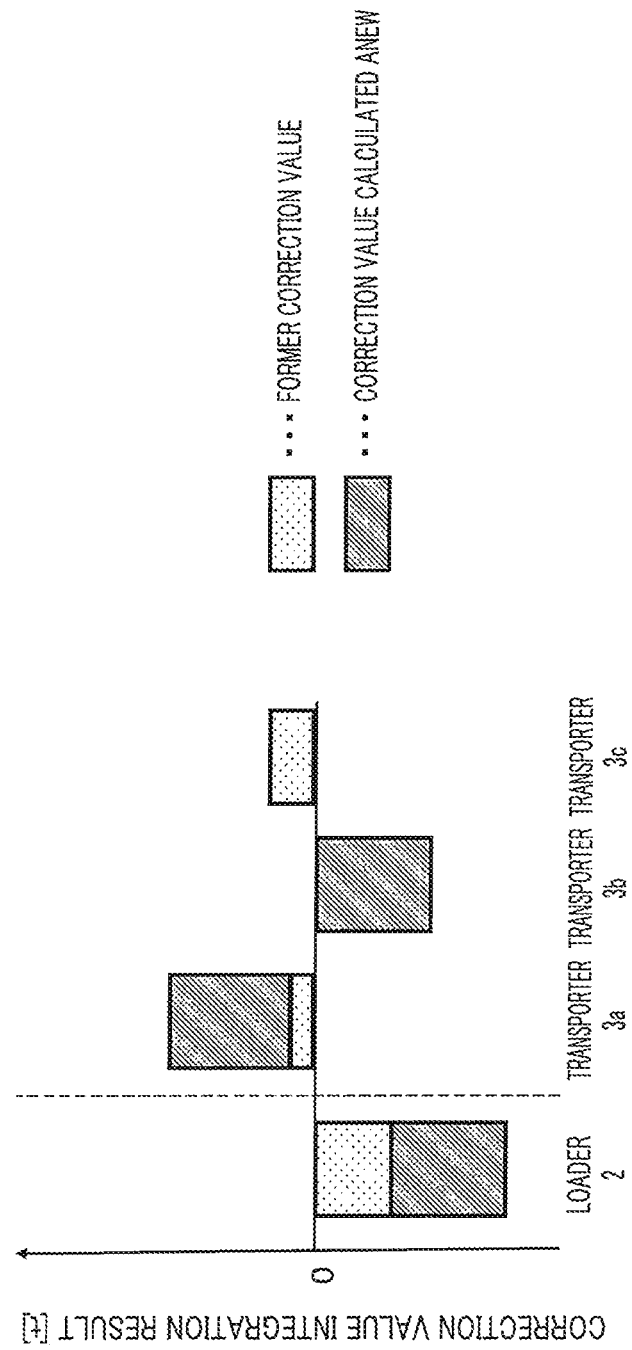
FIG. 20 is a diagram showing forms of the correction value calculation/storage in the first embodiment.

The correction value calculation/storage in step S606 is explained in detail with reference to FIG. 17 to FIG. 20. FIG. 17 shows a subroutine of step S606. FIG. 18 is a schematic diagram concerning correction calculation for the loader. FIG. 19 is a schematic diagram concerning correction calculation for the transporters. FIG. 20 is a schematic diagram concerning integration/storage of correction values.

In step S660 in FIG. 17, it is determined whether the processing has passed step S652 in FIG. 14. When the processing has passed step S652 and the loading-weight calculating unit 400 of the loader 2 is determined as a correction target, the processing shifts to step S661.

In step S661, calculation of a loader correction value by the correction-value calculating unit 404 is performed. FIG. 18(a) shows a correction value calculation result of the loader at the time when the difference calculation result shown in FIG. 15(a) is obtained. A loader correction value W' in this embodiment is calculated using an average of the difference calculation results of all the transporters (transporters 3a to 3c). Since (W−Wa)=11 [t], (W−Wb)=11 [t], and (W−Wc)=14 [t] from FIG. 15(a), the loader correction value W' is calculated as W'=−12 [t]. FIG. 18(b) shows a correction value calculation result of the loader at the time when the difference calculation result shown in FIG. 15(b) is obtained. The loader correction value W' is calculated as W'=12 [t] by the same calculation.

In step S662, it is determined whether the processing has passed step S654 in FIG. 14. When the processing has passed step S654 and the loadage calculating unit 500 of the transporter 3 is determined as a correction target, the processing shifts to step S663.

In step S663, calculation of a transporter correction value by the correction-value calculating unit 404 is performed. FIG. 19(a) shows correction value calculation results of the transporters at the time when the difference calculation results shown in FIG. 16(a) are obtained. Transporter correction values Wa' to Wc' in this embodiment are set to the same values as the difference calculation results of the transporters. Since (W−Wa)=14 [t] from FIG. 16(a), the transporter correction value Wa' is Wa'=14 [t]. FIG. 19(b) shows correction value calculation results of the transporters at the time when the difference calculation results shown in FIG. 16(b) are obtained. The transporter correction value Wb' is calculated as Wb'=−12 [t] and the transporter correction value Wc' is calculated as Wc'=11 [t] by the same calculation.

In step S664, processing for integrating the correction values calculated anew by step S661 or step S663 with the former correction values stored in the correction-value storing unit 405 is performed. FIG. 20 shows an example of an image of correction value integration. Various data of the loader 2 and the transporter 3 forming the image shown in FIG. 20 are not related to the various data of the loader 2 and the transporter 3 forming the images shown in FIG. 15, FIG. 16, FIG. 18, and FIG. 19. FIG. 20 shows an image different from the images shown in FIG. 15, FIG. 16, FIG. 18, and FIG. 19.

In step S665, processing for storing a correction value integration, which is a calculation result of step S664, in the correction-value storing unit 405 is performed.

In step S666, difference storage reset processing for resetting (clearing) the difference calculation results stored in the difference storing unit 402 is performed. Content of the processing is the same as step S655 in FIG. 14.

Effects of the First Embodiment

With the loading correction system 1 configured and operating as explained above, it is possible to mutually monitor and correct measurement values of the loading-weight calculating unit 400 set in the loader 2 and the loadage calculating unit 500 set in the transporter 3. Even when an error occurs in measurement value themselves of measuring devices because of aged deterioration or the like, it is easy to perform appropriate loading with respect to the limit loadage of the transporter 3. Improvement of work efficiency can be expected.

In this embodiment, the determination for regarding that an error occurs in loading weight measurement by the loader 2 when all the difference calculation results stored in the difference storing unit 402 exceed the predetermined threshold is performed. In addition, the determination for regarding that an error occurs in the loadage measurement by the relevant transporter 3 when any one or more difference calculation results stored in the difference storing unit 402 exceeds the predetermined threshold (not including the case in which the difference calculation results of all the transporters exceed the difference threshold in the same direction) is performed. With these correction target determinations, it is possible to easily specify an occurrence target of the error.

Further, in this embodiment, the difference calculating unit 401, the difference storing unit 402, the correction-target determining unit 403, the correction-value calculating unit 404, and the display monitor 270 are respectively set in the loader 2. Therefore, a system configuration is further simplified and a further reduction in cost is possible than when the components are set in places other than the loader 2.

Second Embodiment

A loading correction system that can set a determination period unlike the loading correction system 1 according to the first embodiment is explained below as a second embodiment. Note that content other than content described below is the same as the content in the first embodiment 1 explained above.

<Loader: An Overall Configuration of a Control Circuit>

Figure 21:
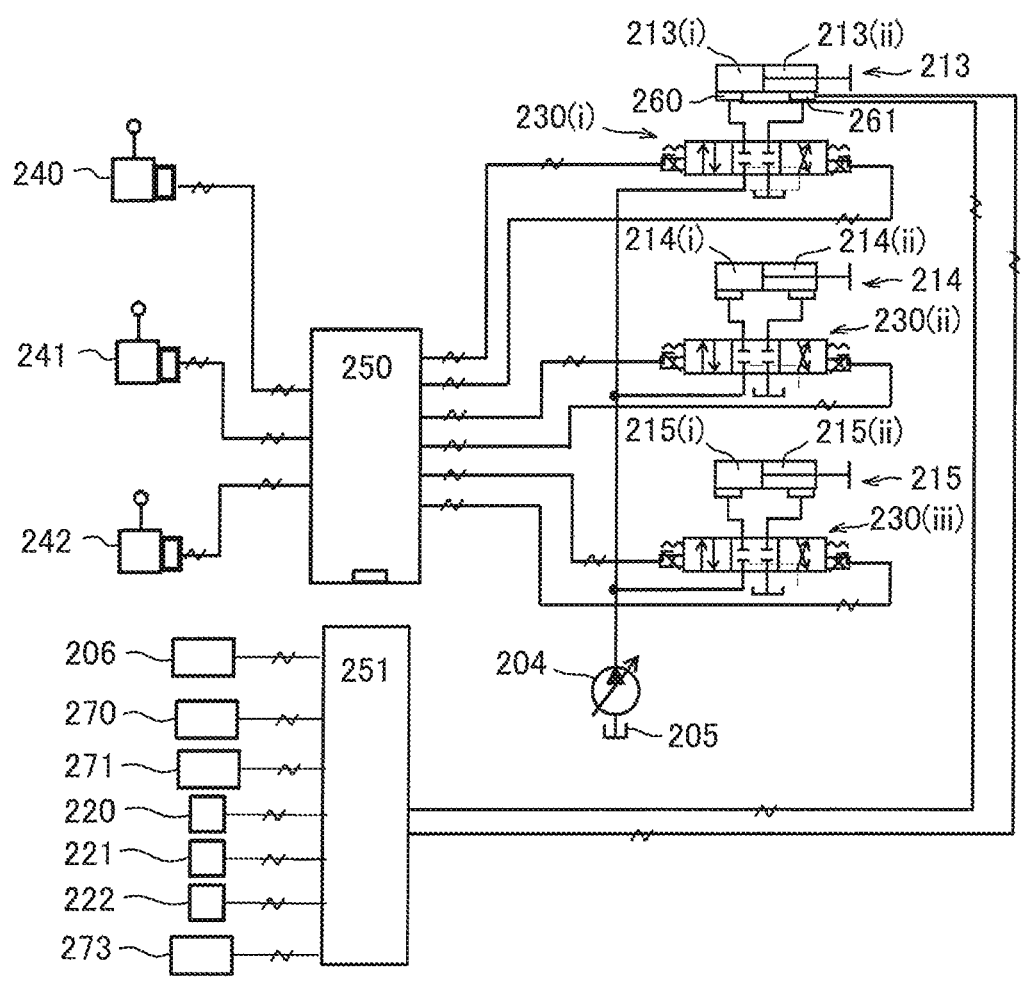
FIG. 21 is a circuit diagram showing a control circuit of a loader in a second embodiment.

A control circuit included in the loader 2 according to the second embodiment is shown in FIG. 21. The control circuit is different from the control circuit according to the first embodiment shown in FIG. 3 in that a determination period setting switch 273 is connected to the weight measurement controller 251.

<Internal Configurations of the Weight Measurement Controllers>

Figure 22:
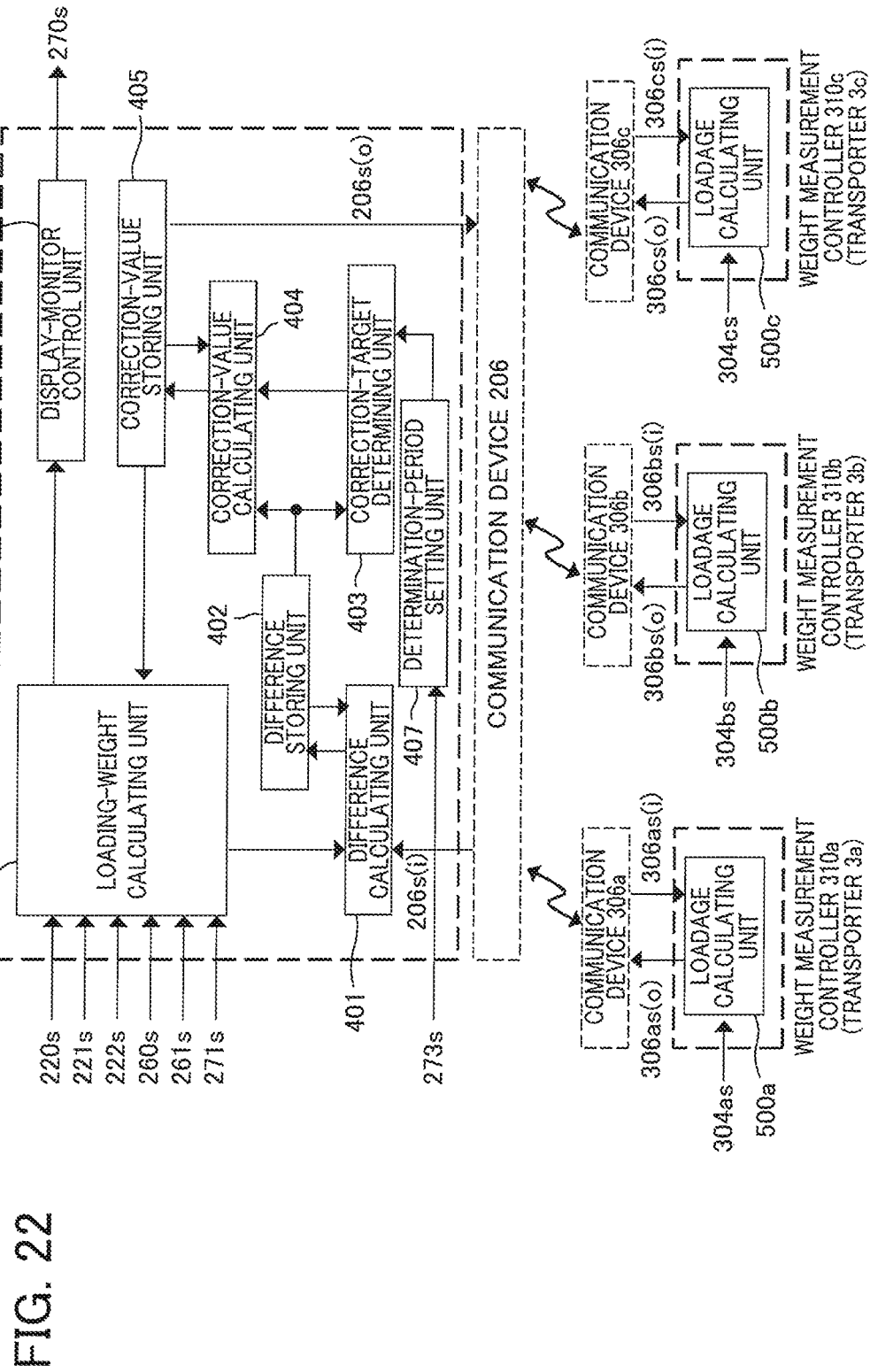
FIG. 22 is a block diagram related to internal configurations of weight measurement controllers in the second embodiment.

Internal configurations of the weight measurement controller 251 and the weight measurement controller 310 according to the second embodiment are shown in FIG. 22. The weight measurement controller 251 and the weight measurement controller 310 are different from the controllers according to the first embodiment shown in FIG. 5 in that a determination-period setting unit 407 capable of setting a period for performing determination is added in the weight measurement controller 251.

Figure 23:
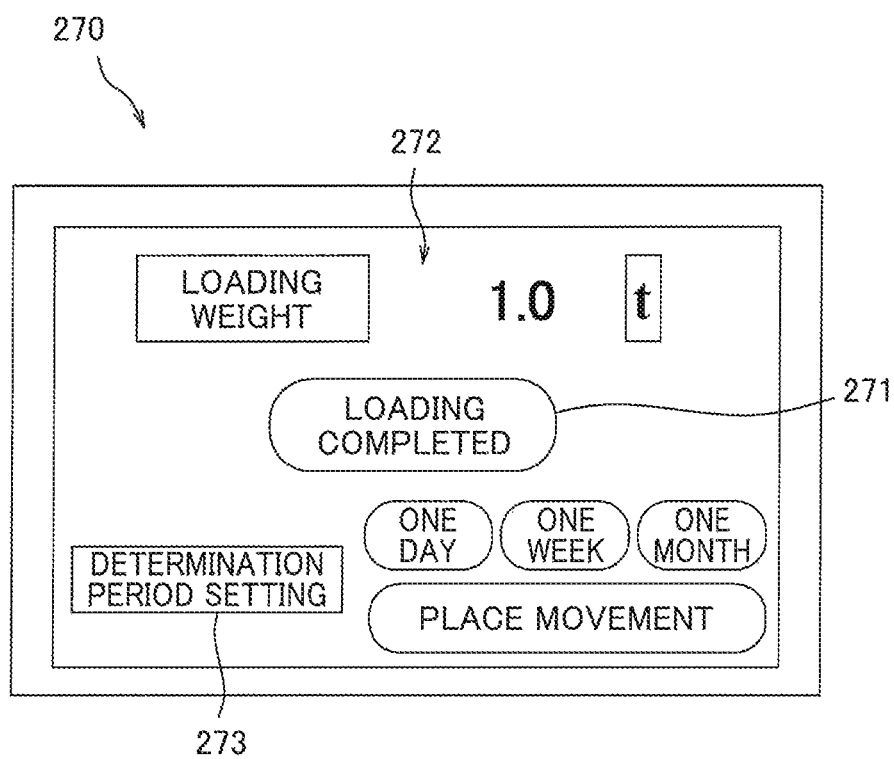
FIG. 23 is an exterior view of a display monitor in the second embodiment.

The determination period setting switch 273 is attached to the display monitor 270 shown in FIG. 23. Any one of "one day", "one week", "one month", and "place movement" is set by the operator of the loader 2. A determination period setting switch signal 273s is input to the determination-period setting unit 407.

«Step S604: Difference Calculation/Storage»

Figure 24:
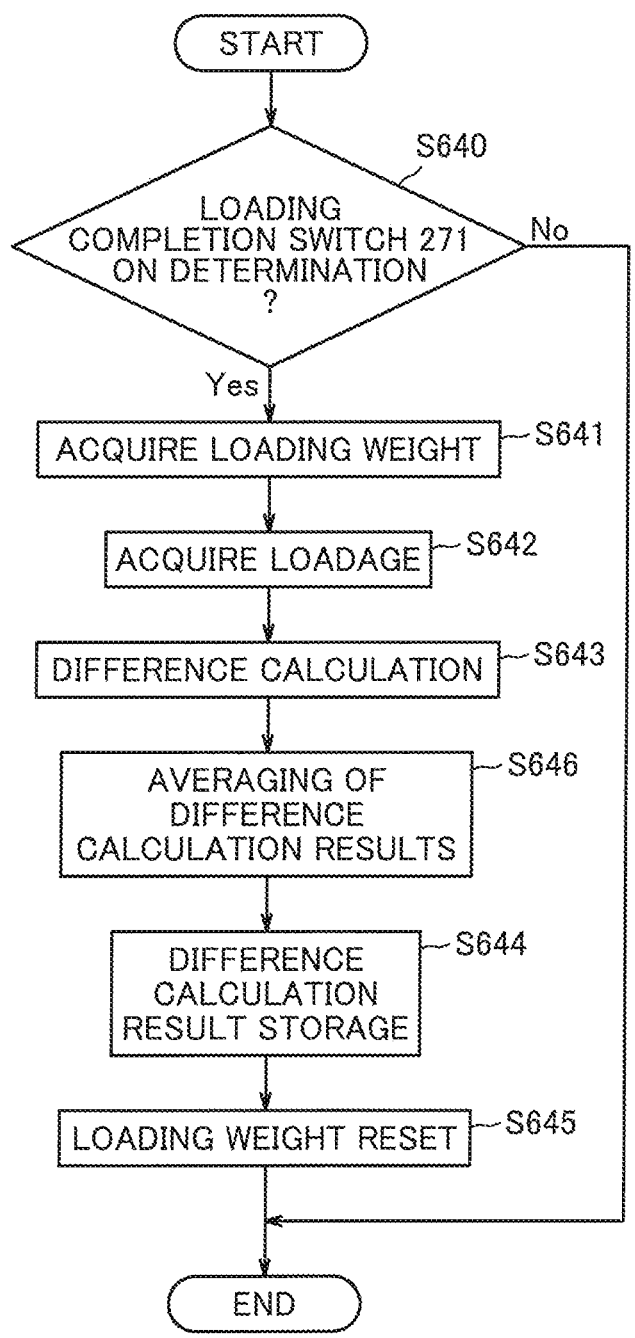
FIG. 24 is a control flowchart of difference calculation/storage in the second embodiment.

The difference calculation/storage in step S604 according to the second embodiment is explained in detail with reference to FIG. 24. FIG. 24 shows a subroutine of step S604. FIG. 24 is different from FIG. 12 in that step S646 is added anew.

In step S646, processing for calculating an average of the difference calculation results using the difference calculation results in step S643 and the former difference calculation results stored in the difference storing unit 402 is performed by the difference calculating unit 401.

In step S644, processing for storing the average of the difference calculation results calculated in step S646 in the difference storing unit 402 is performed.

«Step S605: Correction Target Determination»

Figure 25:
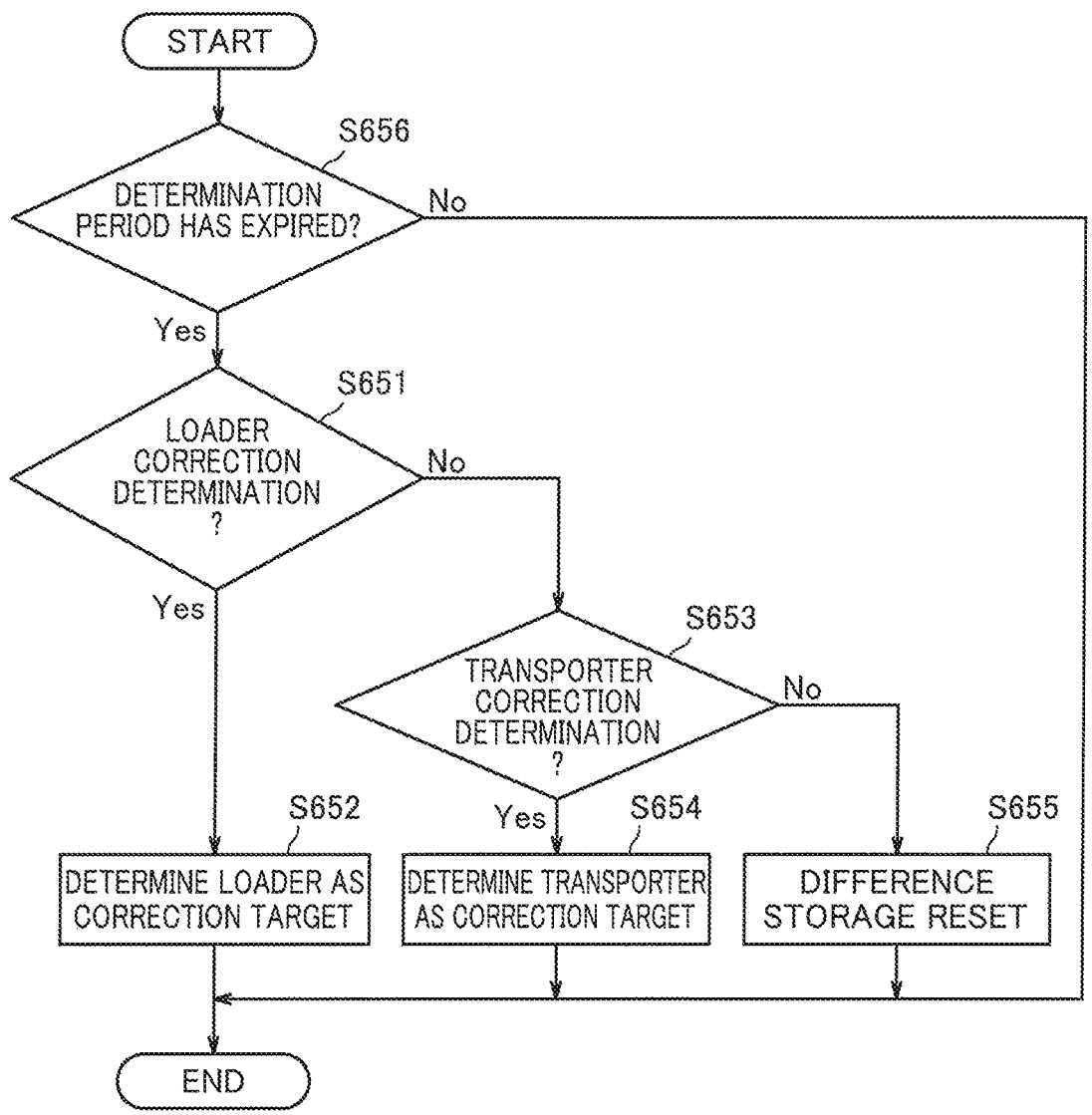
FIG. 25 is a control flowchart of correction target determination in the second embodiment.

The correction target determination in step S605 according to the second embodiment is explained in detail with reference to FIG. 25. FIG. 25 shows a subroutine of step S605. FIG. 25 is different from FIG. 14 in that step S650 is replaced with step S656.

In step S656, it is determined according to a setting state of the determination-period setting unit 407 whether a determination period has expired. When the setting state of the determination period setting switch 273 is "one day", "one week", and "one month", an elapsed time from the setting of the switch is measured by a not-shown time measuring device in the weight measurement controller 251. When the elapsed time exceeds the setting of the switch, the determination period is regarded as having expired. The processing shifts to step S651. Thereafter, the same processing as the processing in the first embodiment is performed.

On the other hand, when the setting state of the determination period setting switch 273 is "place movement", a work place of the loader 2 is determined using a not-shown GPS connected to the weight measurement controller 251. When the loader 2 moves from a preset work place to another work place, the determination period is regarded as having expired. The processing shifts to step S651. Thereafter, the same processing as the processing in the first embodiment is performed.

Note that the processing concerning the determination whether the determination period has expired (step S656) is executed by the determination-period setting unit 407 because the determination period setting switch signal 273s is input to the determination-period setting unit 407.

Effects of the Second Embodiment

With the loading correction system 1 according to the second embodiment configured and operating as explained above, the correction target determination and the correction value calculation are performed using difference storage information in a period set by a user in advance. It is possible to perform appropriate correction value calculation adapted to a method of using the loading correction system and an environment of use of the loading correction system. Therefore, in addition to the effects of the first embodiment, further improvement of work efficiency and further improvement of usability can be expected.

Third Embodiment

A loading correction system that can perform display concerning a correction value unlike the loading correction system 1 according to the first embodiment is explained below as a third embodiment. Note that content other than content described below is the same as the content in the first embodiment explained above.

<Internal Configurations of the Weight Measurement Controllers>

Figure 26:
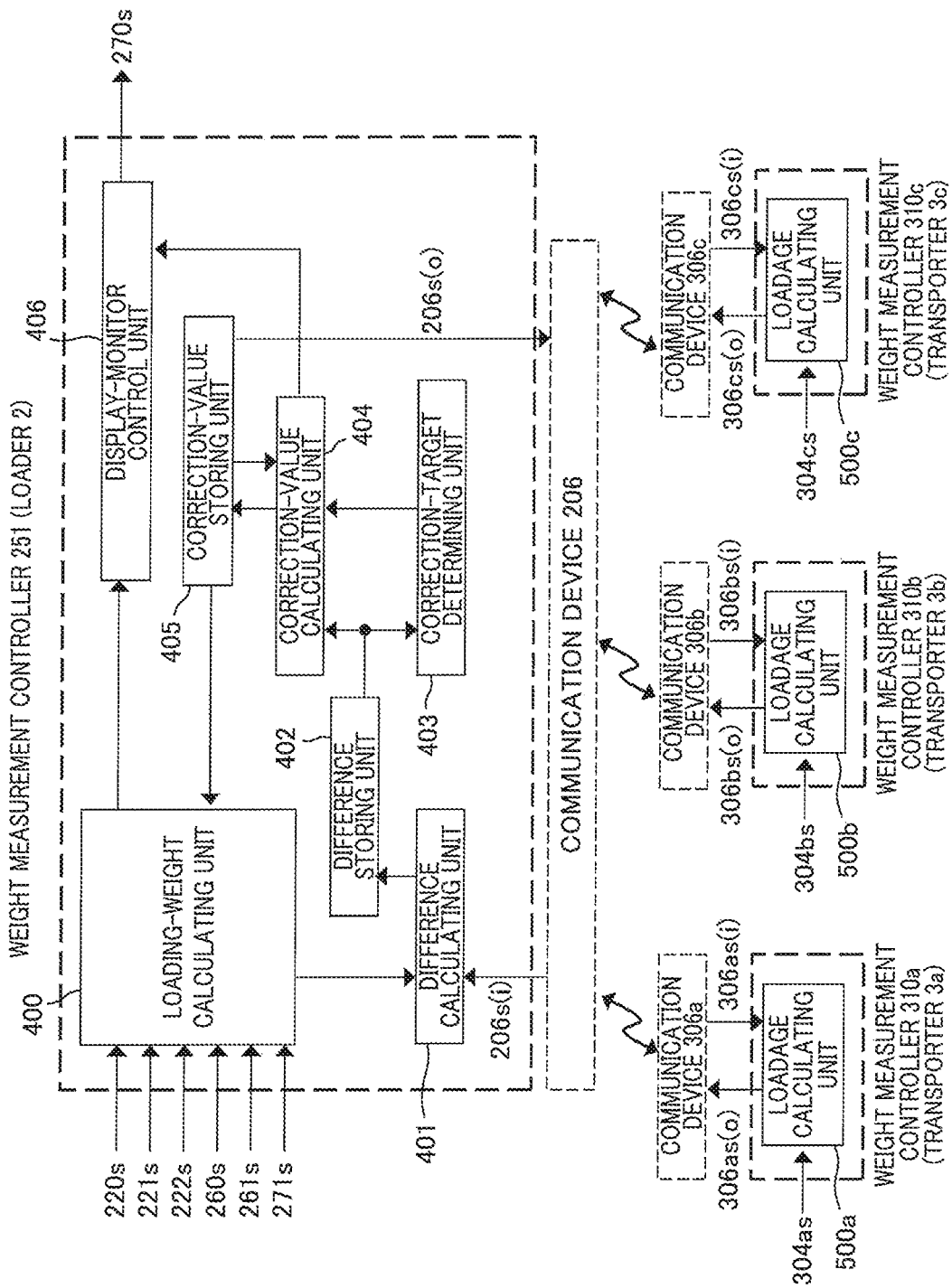
FIG. 26 is a block diagram related to internal configurations of weight measurement controllers in a third embodiment.

Internal configurations of the weight measurement controller 251 and the weight measurement controller 310 according to the third embodiment are shown in FIG. 26.

The weight measurement controller 251 and the weight measurement controller 310 are different from the controllers according to the first embodiment shown in FIG. 5 in that the correction-value calculating unit 404 is connected to the display-monitor control unit 406. That is, in the third embodiment, data concerning a correction value is input to the display monitor 270 via the display-monitor control unit 406. Information concerning the correction value is displayed on the display monitor 270.

Figure 27:
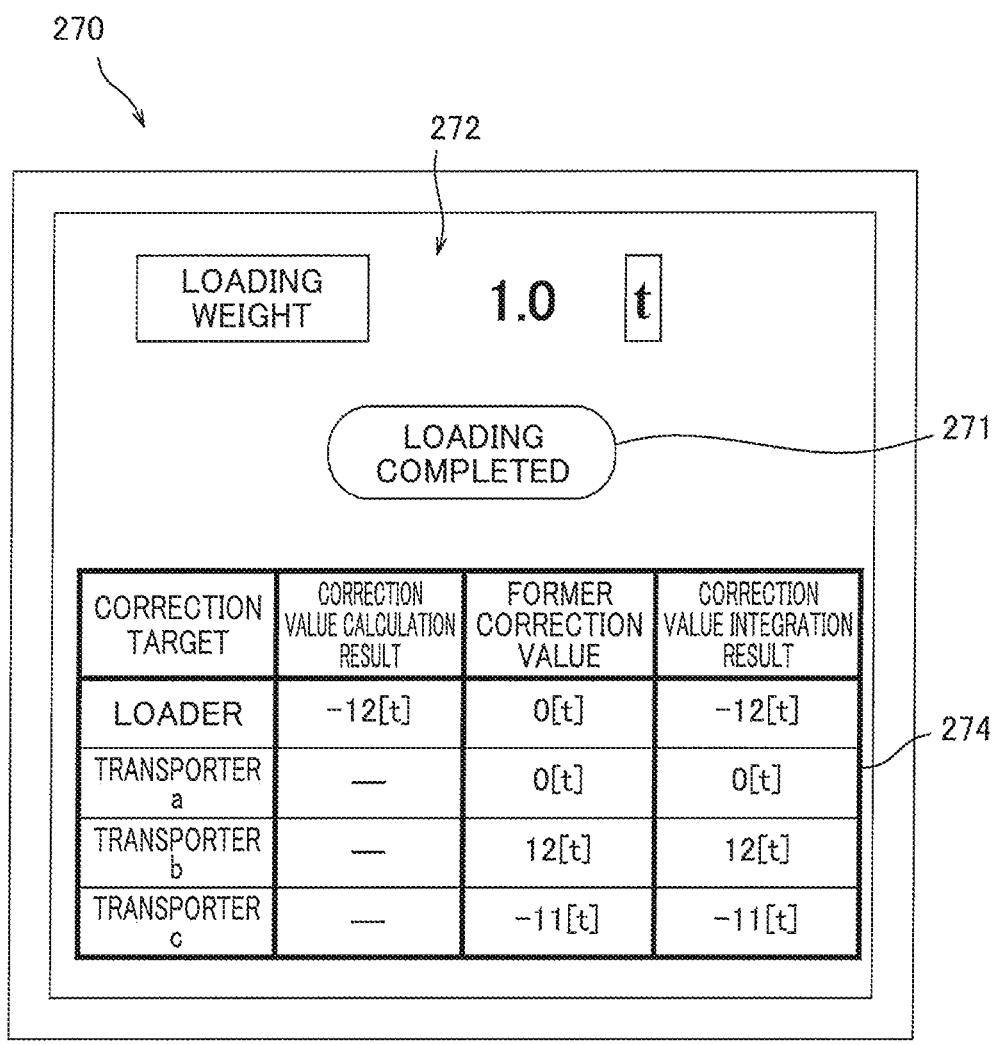
FIG. 27 is an exterior view of a display monitor in the third embodiment.

In FIG. 27, the exterior of the display monitor 270 in this embodiment is shown. Information concerning a correction target and a correction value via the display-monitor control unit 406 is displayed on a correction target/correction value display unit 274 shown in FIG. 27. As shown in FIG. 27, the loader 2 and the three transporters 3 are displayed as correction targets and correction value calculation results, former correction values, and correction value integration results of the correction targets are displayed on the correction target/correction value display unit 274. That is, in this embodiment, former correction values, correction value calculation performed immediately before, and new correction values are displayed.

«Step S606: Correction Value Calculation/Storage»

Figure 28:
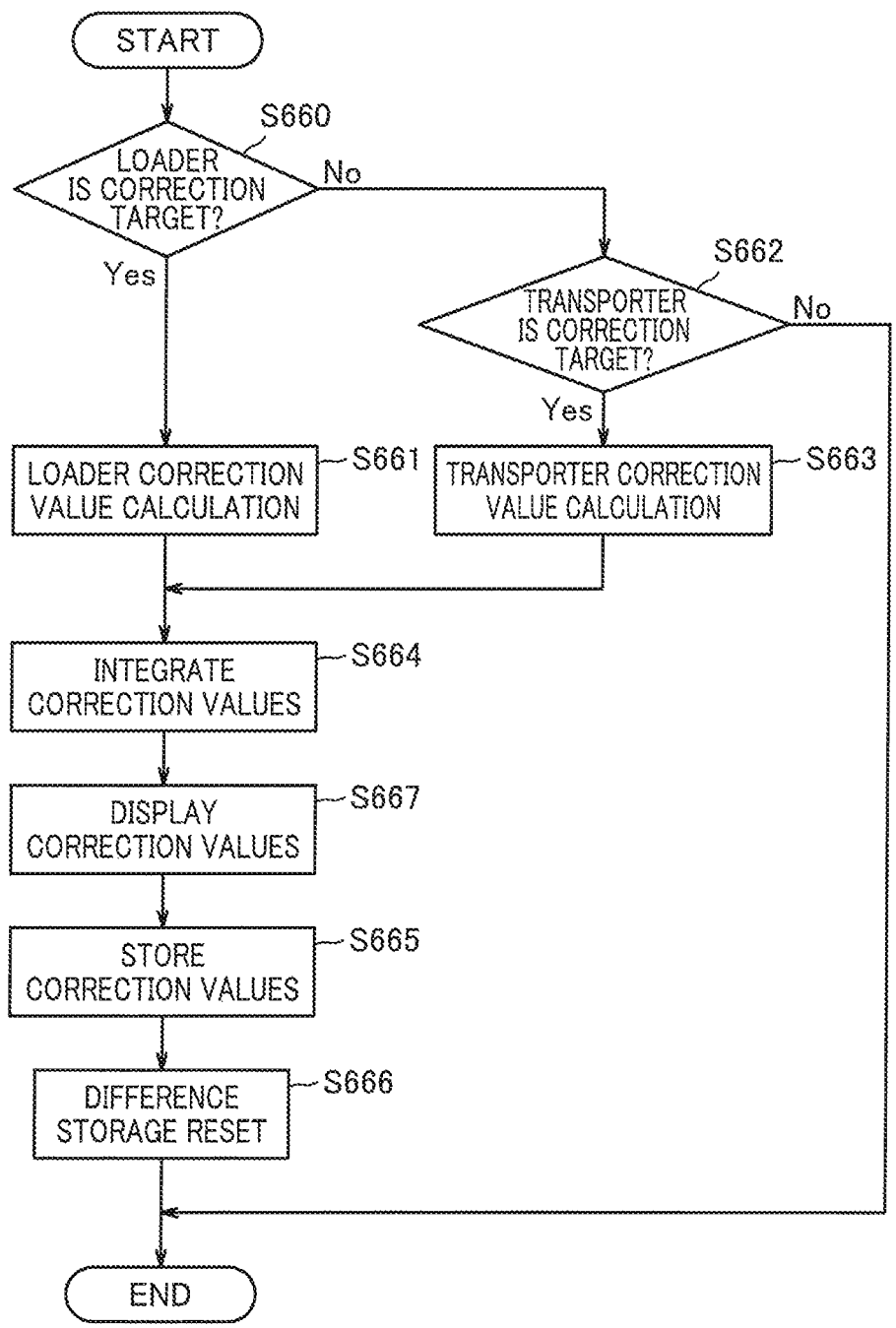
FIG. 28 is a control flowchart of correction value calculation/storage in the third embodiment.

The correction value calculation/storage in step S606 according to the third embodiment is explained in detail with reference to FIG. 28. FIG. 28 shows a subroutine of step S606. FIG. 28 is different from FIG. 17 in that step S667 is added anew.

In step S667, processing for displaying, on the correction target/correction value display unit 274 shown in FIG. 27, the correction value calculation results calculated anew by step S661 or step S663, the former correction values stored in the correction-value storing unit 405, and the correction value integration result calculated in step S664 is performed.

Effects of the Third Embodiment

With the loading correction system 1 according to the third embodiment configured and operating as explained above, the operator of the loader 2 and an administrator of the loading correction system are capable of grasping present correction value information. In addition to the effects of the first embodiment, improvement of usability can be expected, for example, it is possible to determine propriety of recalibration implementation of the loading-weight calculating unit 400 and the loadage calculating unit 500.

Fourth Embodiment

A loading correction system in which an operator can determine whether to carry out correction unlike the loading correction system 1 according to the third embodiment is explained below as a fourth embodiment. Note that content other than content described below is the same as the content in the first embodiment and the third embodiment explained above.

<Loader: Overall Configuration of a Control Circuit>

Figure 29:
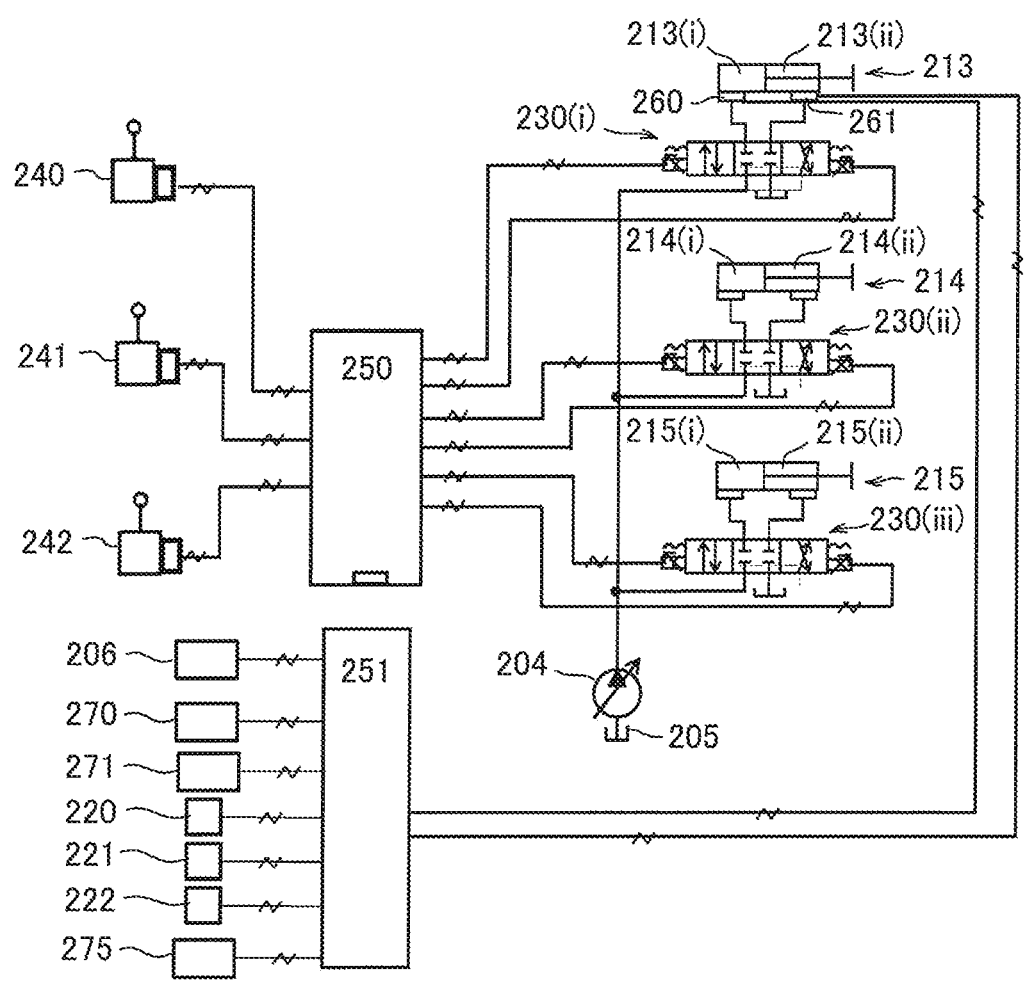
FIG. 29 is a circuit diagram showing a control circuit of a loader in a fourth embodiment.

A control circuit included in the loader 2 according to the fourth embodiment is shown in FIG. 29. The control circuit is different from the control circuit according to the first embodiment shown in FIG. 3 in that a correction implementation determination switch 275 is connected to the weight measurement controller 251.

<Internal Configurations of the Weight Measurement Controllers>

Figure 30:
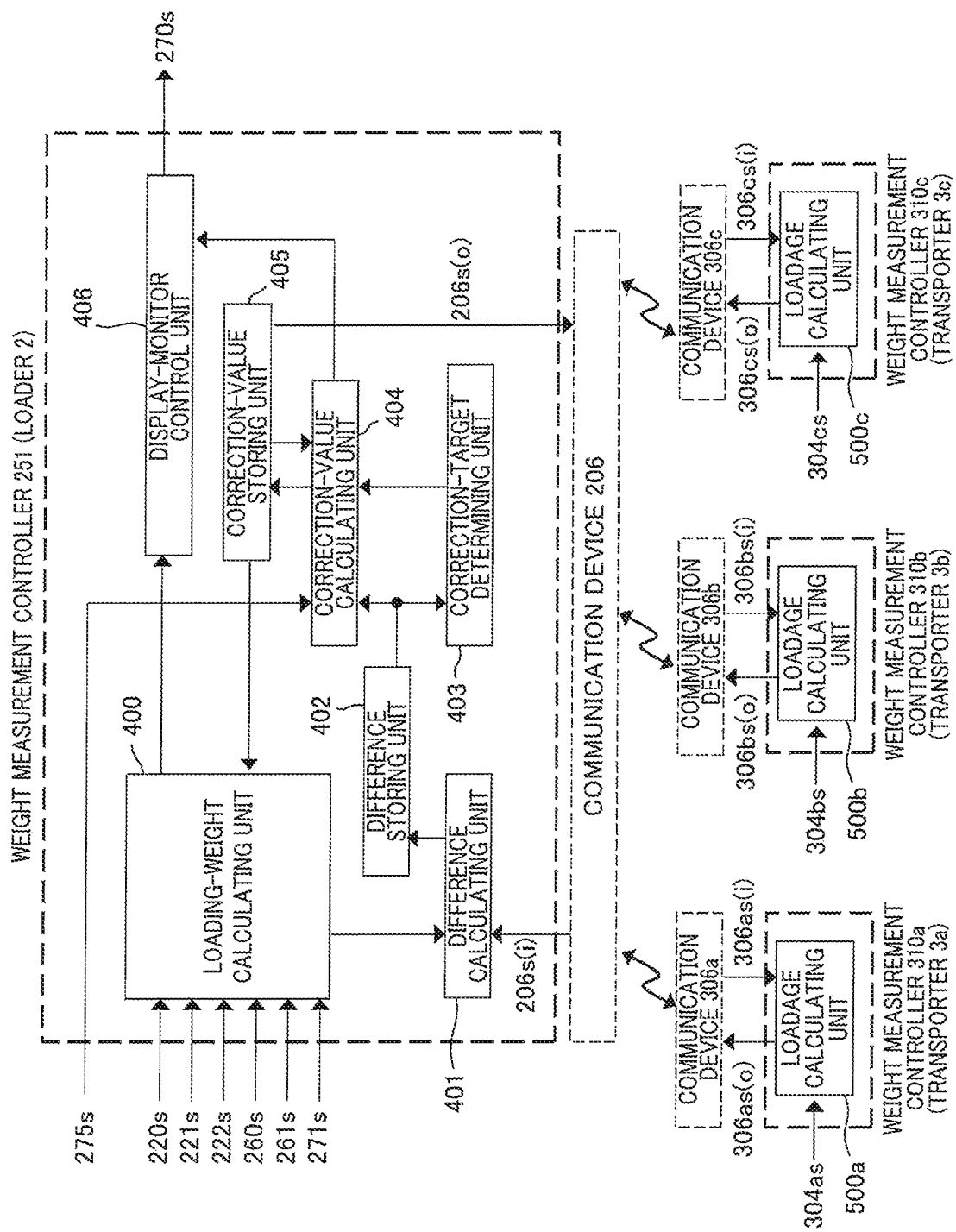
FIG. 30 is a block diagram related to internal configurations of weight measurement controllers in the fourth embodiment.

Internal configurations of the weight measurement controller 251 and the weight measurement controller 310 according to the fourth embodiment are shown in FIG. 30. The weight measurement controller 251 and the weight measurement controller 310 are different from the controllers according to the third embodiment shown in FIG. 26 in that a correction implementation determination switch signal 275s is input to the correction-value calculating unit 404.

Figure 31:
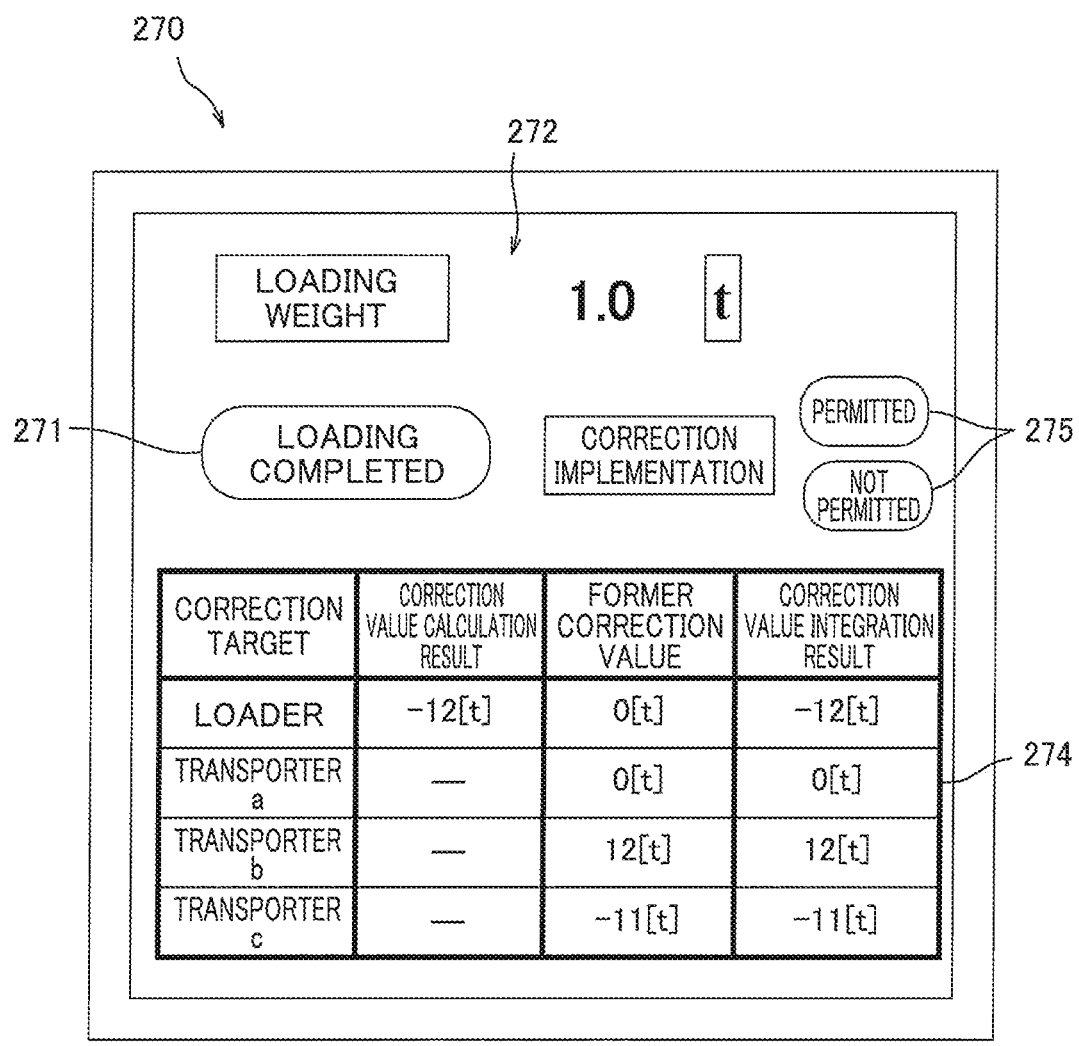
FIG. 31 is an exterior view of a display monitor in the fourth embodiment.

The correction implementation determination switch 275 is attached to the display monitor 270 shown in FIG. 31 and receives pressing by the operator of the loader 2. That is, by selecting and pressing one of "permitted" and "not permitted" shown in FIG. 31, the operator of the loader 2 can select whether to perform new correction.

«Step S606: Correction Value Calculation/Storage»

Figure 32:
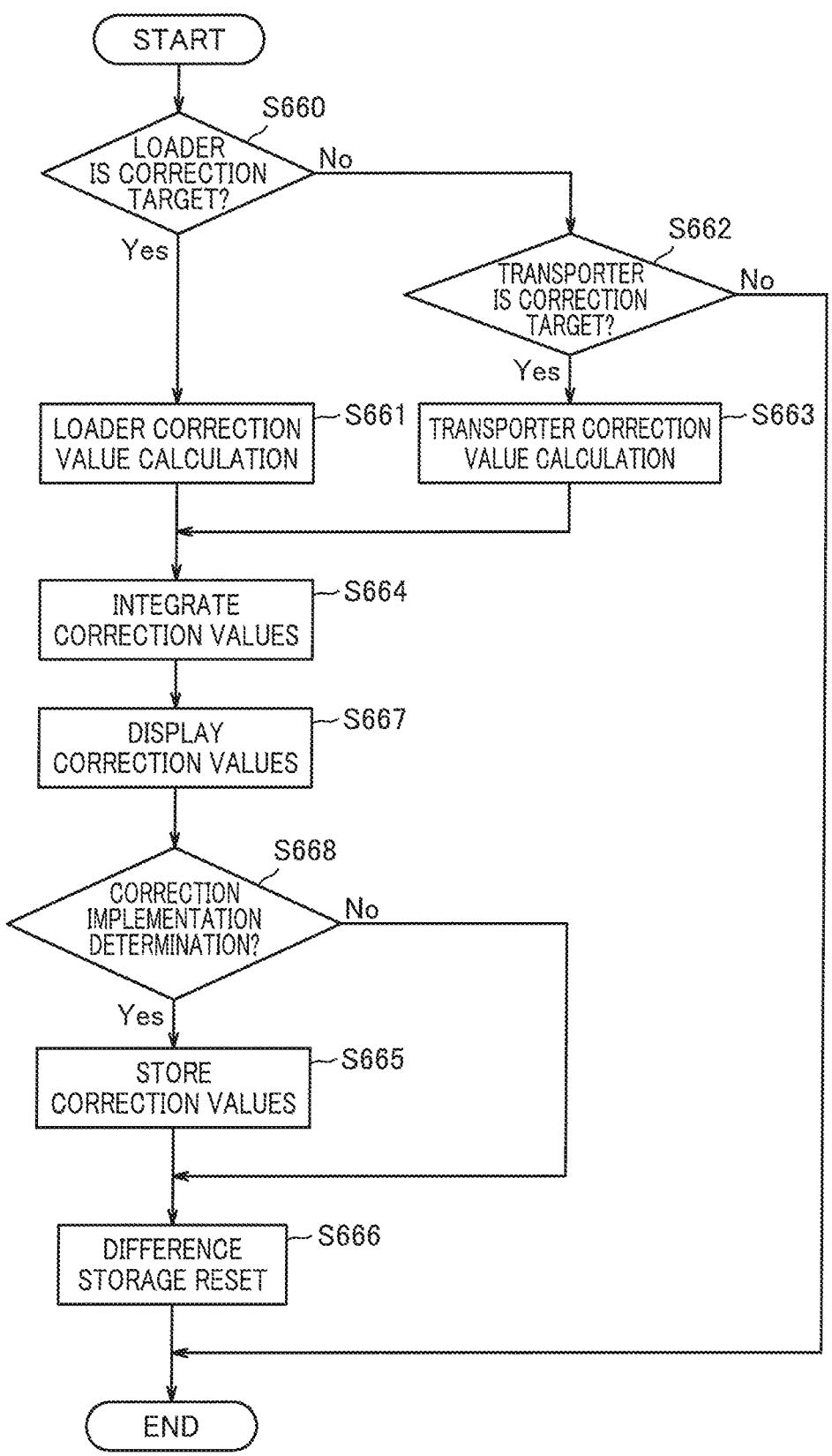
FIG. 32 is a control flowchart of correction value calculation/storage in the fourth embodiment.

The correction value calculation/storage in step S606 according to the fourth embodiment is explained in detail with reference to FIG. 32. FIG. 32 shows a subroutine of step S606. FIG. 32 is different from FIG. 28 in that step S668 is added anew.

In step S668, the correction-value calculating unit 404 determines whether to store, in the correction-value storing unit 405, the displayed values displayed on the correction target/correction value display unit 274 shown in FIG. 31 by the processing in step S667. That is, in this embodiment, the correction-value calculating unit 404 functions as a correction-implementation determining unit as well.

Specifically, when "permitted" of the correction implementation determination switch 275 is pressed by the operator of the loader 2, the correction-value calculating unit 404 determines to perform correction. The processing of the flow shifts to step S665 and a new correction value is stored in the correction-value storing unit 405. On the other hand, when "not permitted" of the correction implementation determination switch 275 is pressed, the correction-value calculating unit 404 determines not to perform correction. The processing of the flow shifts to step S666. A new correction value is not recorded in the correction-value storing unit 405 and the difference storage is reset.

Effects of the Fourth Embodiment

With the loading correction system 1 according to the fourth embodiment configured and operating as explained above, the operator of the loader 2 and the administrator of the loading correction system 1 are capable of making a decision concerning adoption or rejection of a correction value calculated anew. Since it is possible to prevent unintended correction, improvement of usability can be expected in addition to the effects of the first embodiment.

Fifth Embodiment

A loading correction system in which an operator can easily grasp necessity of recalibration unlike the loading correction system 1 according to the third embodiment is explained below as a fifth embodiment. Note that content other than content described below is the same as the content in the first embodiment and the third embodiment explained above.

<Internal Configurations of the Weight Measurement Controllers>

Figure 33:
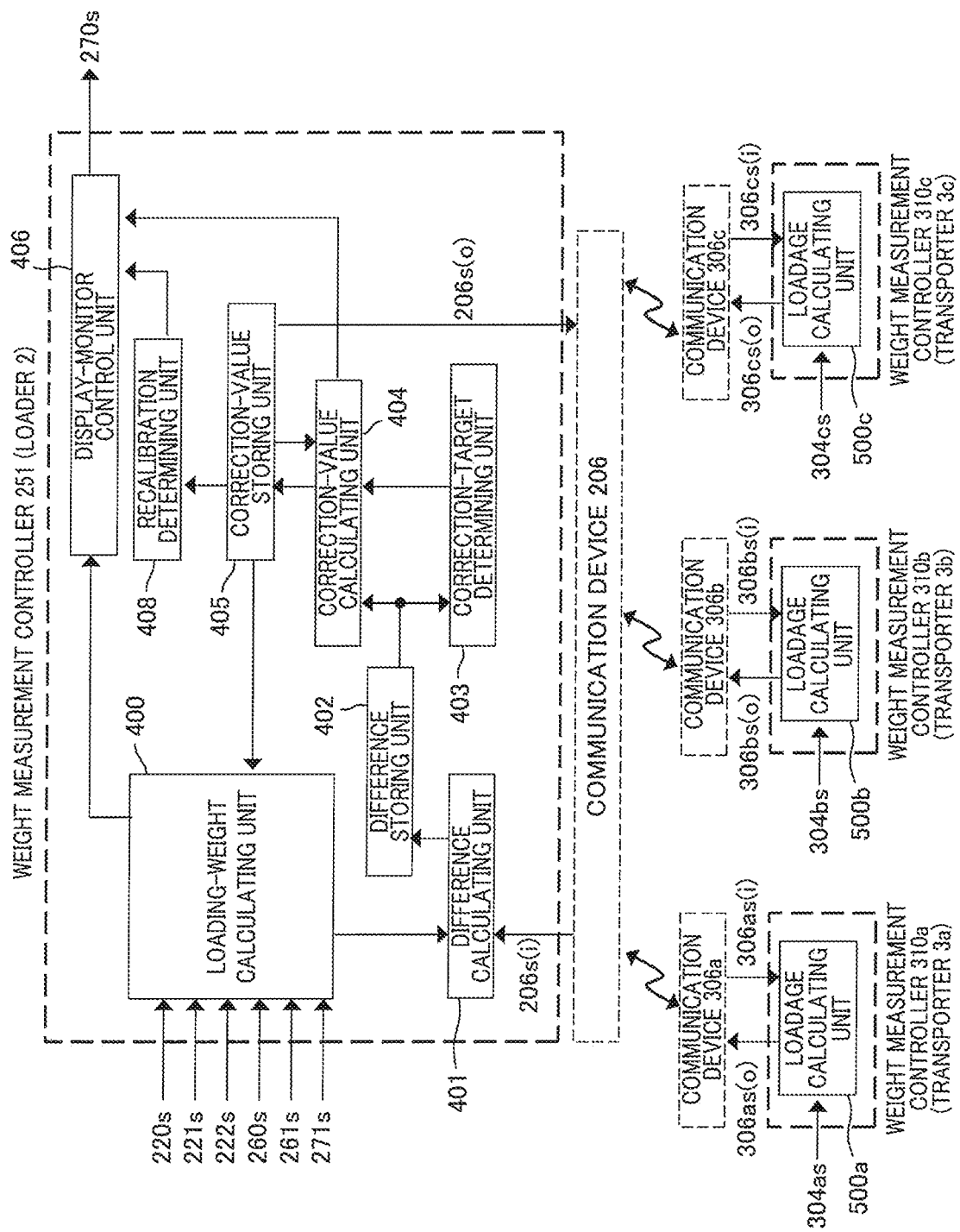
FIG. 33 is a block diagram related to internal configurations of weight measurement controllers in a fifth embodiment.

Internal configurations of the weight measurement controller 251 and the weight measurement controller 310 according to the fifth embodiment are shown in FIG. 33. The weight measurement controller 251 and the weight measurement controller 310 are different from the controllers according to the third embodiment shown in FIG. 26 in that a recalibration determining unit 408 is added in the weight measurement controller 251. The recalibration determining unit 408 is connected to the display-monitor control unit 406. Therefore, in the fifth embodiment, information concerning a determination result of recalibration is also input to the display monitor 270 via the display-monitor control unit 406. The recalibration determination result is displayed on the display monitor 270.

Figure 34:
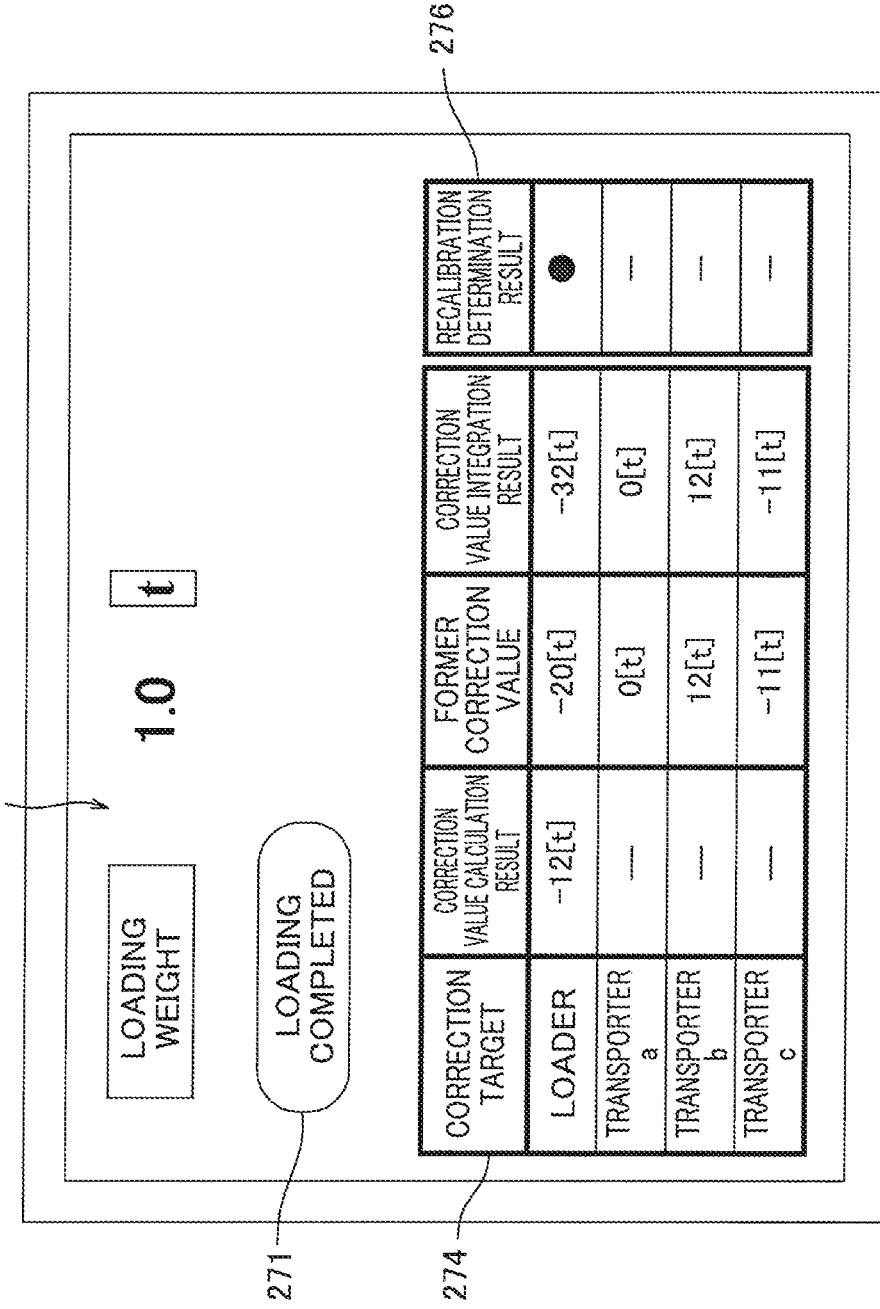
FIG. 34 is an exterior view of a display monitor in the fifth embodiment.

The exterior of the display monitor 270 in this embodiment is shown in FIG. 34. A determination result of the recalibration determining unit 408 via the display-monitor control unit 406 is displayed on a recalibration-determination-result display unit 276. In an example shown in FIG. 34, necessity of recalibration is displayed for correction targets. The operator of the loader 2 can easily grasp the necessity of recalibration.

<Overall Processing Flow of the Weight Measurement Controllers>

Figure 35:
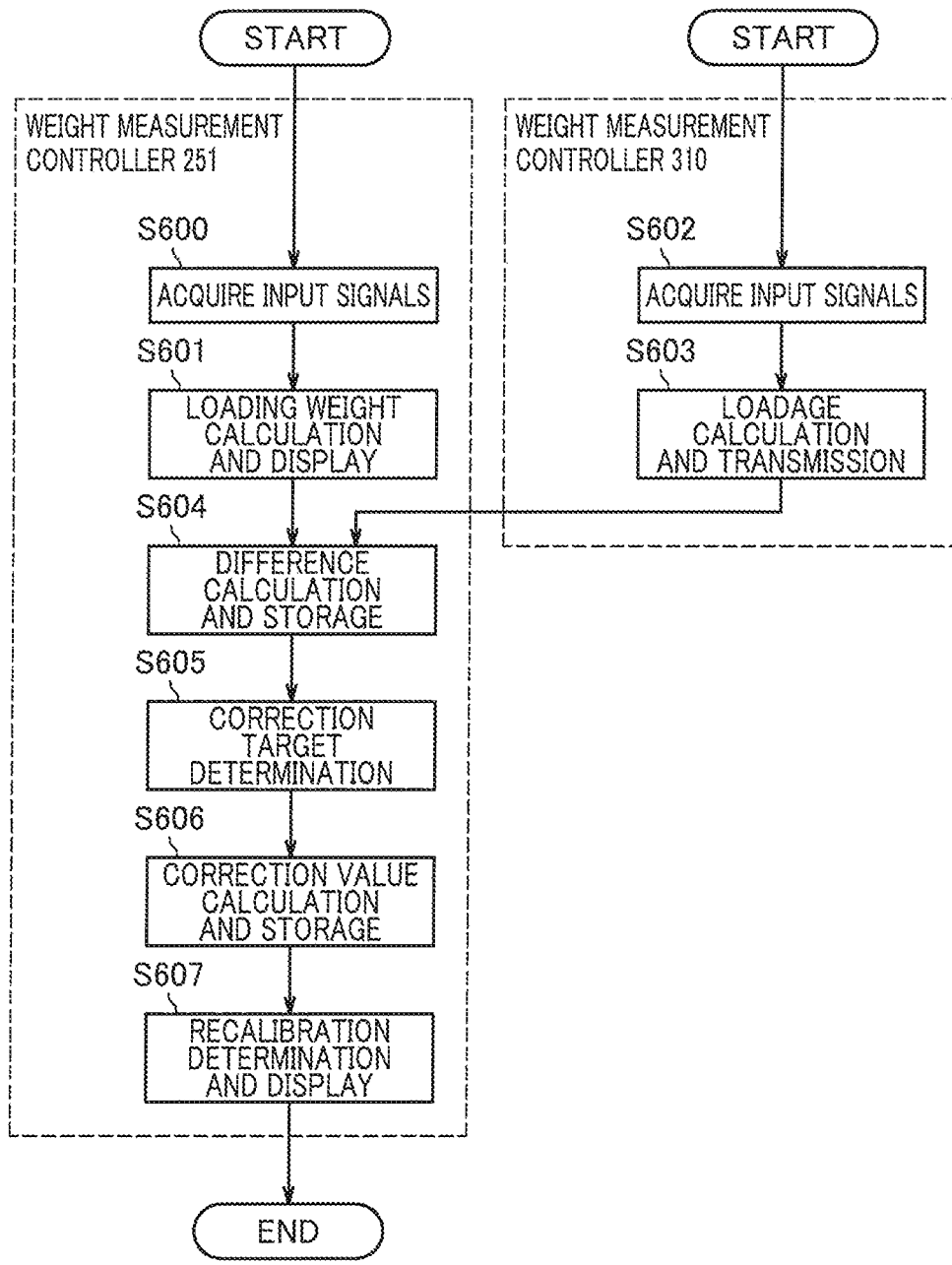
FIG. 35 is an overall processing flowchart of the weight measurement controllers in the fifth embodiment.

An overall processing flow of the weight measurement controller 251 and the weight measurement controller 310 according to the fifth embodiment is shown in FIG. 35. The overall processing flow is different from the overall processing flow in the first embodiment shown in FIG. 6 in that step S607 is added anew.

In step S607, recalibration determination by the recalibration determining unit 408 and display processing on the display monitor 270 via the display-monitor control unit 406 are performed.

In the recalibration determining unit 408, recalibration determination threshold for determining that recalibration is necessary is set in advance with respect to the correction value stored in the correction-value storing unit 405. In this embodiment, a recalibration determination threshold on a plus side is set to 30 [t] and a recalibration determination threshold on a minus side is set to −30 [t]. When the correction value stored in the correction-value storing unit 405 exceeds the recalibration determination threshold (that is, the correction value is larger than 30 or smaller than −30), indication to the effect that the recalibration is necessary is displayed on the recalibration-determination-result display unit 276. In this embodiment, it is determined that recalibration is necessary ("●") for the loader 2, a correction value integration result of which displayed on the correction target/correction value display unit 274 is −32 [t].

Effects of the Fifth Embodiment

With the loading correction system 1 according to the fifth embodiment configured and operating as explained above, it is possible to set, in advance, a range of a correction value for the loading-weight calculating unit 400 or the loadage calculating unit 500 and, when the correction value is outside the range, inform the operator of the loader 2 and the administrator of the loading correction system 1 to that effect. Therefore, since it is possible to easily grasp timing when recalibration (maintenance) should be performed, improvement of usability can be expected in addition to the effects of the first embodiment.

(Modifications)

The present invention is not limited to the embodiments explained above. In the following explanation, configurations, processing flows, and the like of various modifications are explained.

Figure 36:
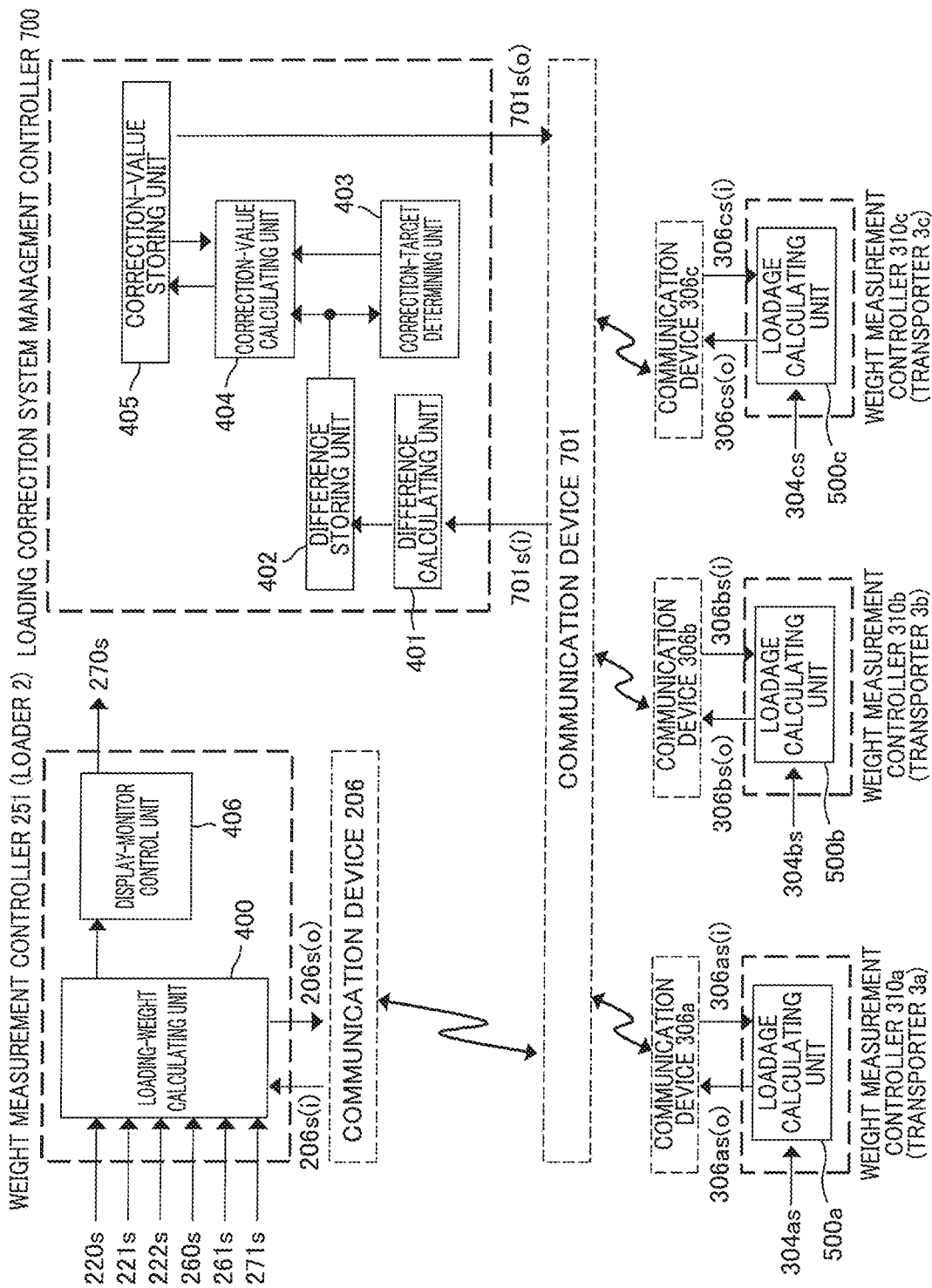
FIG. 36 is a block diagram related to internal configurations of weight measurement controllers in a modification.

In the embodiments explained above, in order to perform determination of a correction target, calculation of a correction value, and the like in the weight measurement controller 251 of the loader 2, for example, as shown in FIG. 5, the difference calculating unit 401, the difference storing unit 402, the correction-target determining unit 403, the correction-value calculating unit 404, and the correction-value storing unit 405 are provided on the inside of the weight measurement controller 251. However, the loading correction system 1 is not limited to such a configuration. For example, the components for performing determination of a correction target, calculation of a correction value, and the like can also be set on the outside of the vehicle of the loader 2. For example, as shown in FIG. 36, an external central management apparatus (management center) including a loading correction system management controller 700 and a communication device 701 can be provided anew.

Specifically, in a loadage correction system according the modification explained above, the difference calculating unit 401, the difference storing unit 402, the correction-target determining unit 403, the correction-value calculating unit 404, and the correction-value storing unit 405 are provided on the inside of the loading correction system management controller 700 of the central management apparatus. In the loadage correction system according to the modification, the loader 2 and the transporters 3 do not transmit and receive various kinds of information each other. Information concerning a loading weight of the loader 2, information concerning loadage of the transporters 3, and the like are input to the loading correction system management controller 700 as a communication signal 701s(i) according to communication connection by the communication device 206 and the communication device 701 or the communication device 306 and the communication device 701. Further, information such as a correction value calculated in the loading correction system management controller 700 is output to the loader 2 or the respective transporters 3 via the communication device 701 as a communication signal 701s(o).

Note that, in the loadage correction system according to the modification, a communication unit that performs various kinds of data transfer is configured from the communication device 206, the communication device 306, and the communication device 701.

In the first embodiment explained above, as shown in FIG. 7 and FIG. 8, the completion of the loading work of the loader 2 is instructed using the loading completion switch 271. However, the instruction of the completion of the loading work is not limited to this. For example, the number of times of loading on the transporter 3 by the loader 2 may be set in advance and it may be determined, according to whether the set number of times of loading has been reached, whether the loading work of the loader 2 is completed.

Figure 37:
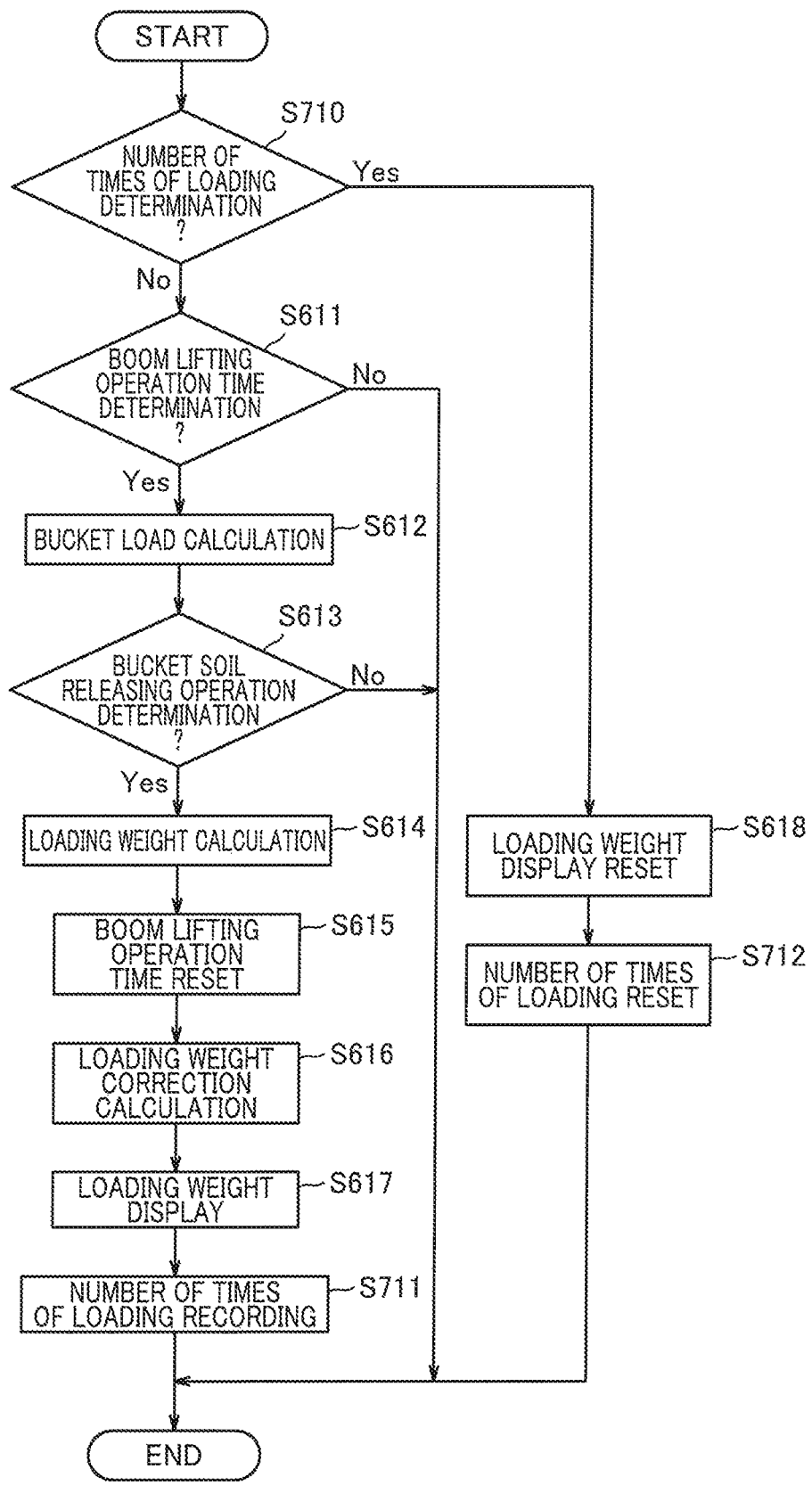
FIG. 37 is a control flowchart of loading weight calculation/display in the modification.

Specifically, in step S710 in FIG. 37, instead of step S610 in FIG. 7, number of times of loading determination concerning whether a preset number of times of loading has been reached is performed. The number of times of loading weight calculation is stored (counted) as processing in step S711 after the completion of the processing of the loading weight display in step S617. Further, when it is determined that the preset number of times of loading has been reached and the loading work of the loader 2 is completed (Yes in step S710), the number of times of loading is reset as the processing in step S711 after the processing of the loading weight display reset in step S618.

With the configuration of the modification shown in FIG. 37, since the loading completion switch pressing can be omitted, an effect of reducing a work load of the loader operator is obtained.

Figure 38:
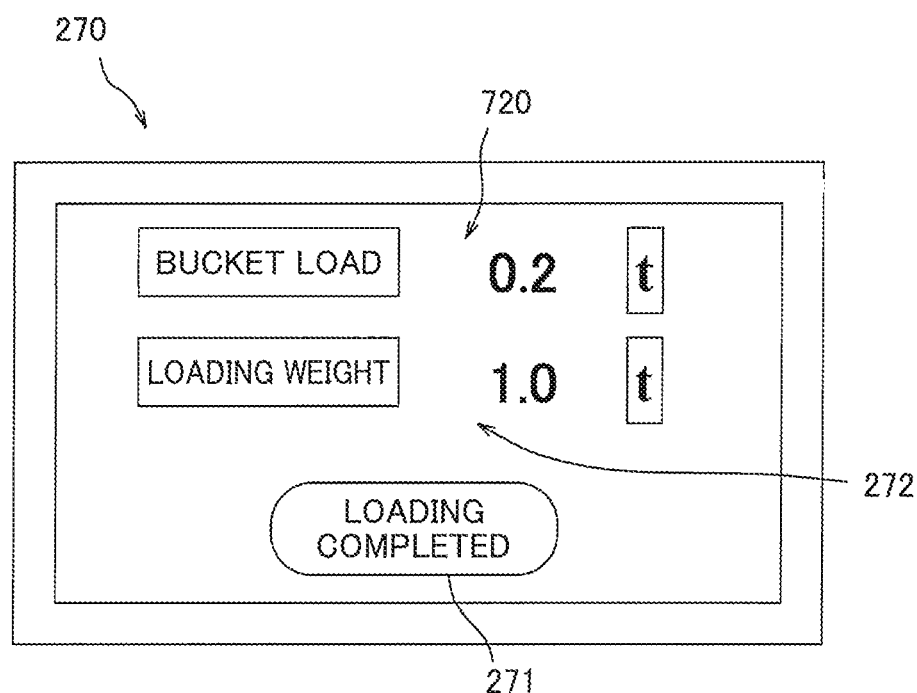
FIG. 38 is an exterior view of a display monitor in the modification.

Further, in the first embodiment explained above, the correction calculation is performed for the loading weight from the loader 2 to the transporter 3. However, the correction calculation may be performed for a bucket load of the loader 2. In such a case, unlike the exterior of the display monitor 270 in the first embodiment shown in FIG. 8, for example, as shown in FIG. 38, a bucket-load display unknit 720 can be added.

Figure 39:
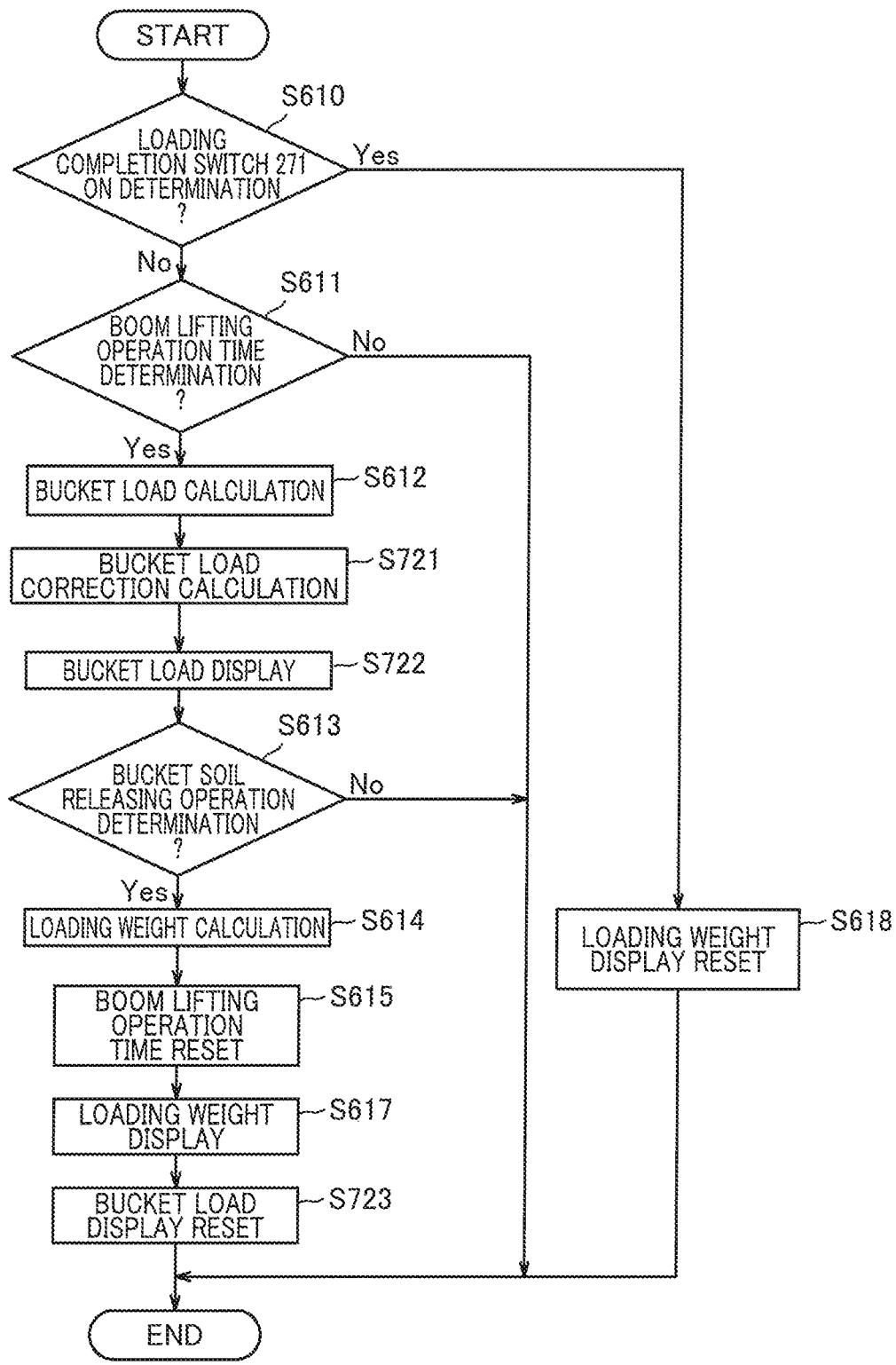
FIG. 39 is a control flowchart of loading weight calculation/display in the modification.

A flow of loading weight calculation/display in the case of such a modification is shown in FIG. 39. FIG. 39 is different from FIG. 7 in the first embodiment in that the loading weight correction calculation in step S616 is replaced with bucket load correction calculation in step S721 and in that bucket load display in step S722 and bucket display load reset in step S723 are added anew. Note that, concerning the replacement of the loading weight correction calculation with the bucket load correction calculation, for example, a method of dividing the correction value stored in the correction-value storing unit 405 by the number of times of loading on the transporter by the loader is conceivable, With the configuration of the modification shown in FIG. 38, a bucket load of minerals, gravel, or the like loaded on the bucket of the loader 2 is displayed. Therefore, it is easy for the operator of the loader to grasp a loading weight after loading on the transporter 3 beforehand. Since it is easy to realize target loadage of the transporter 3, further improvement of work efficiency can be expected.

Figure 40:
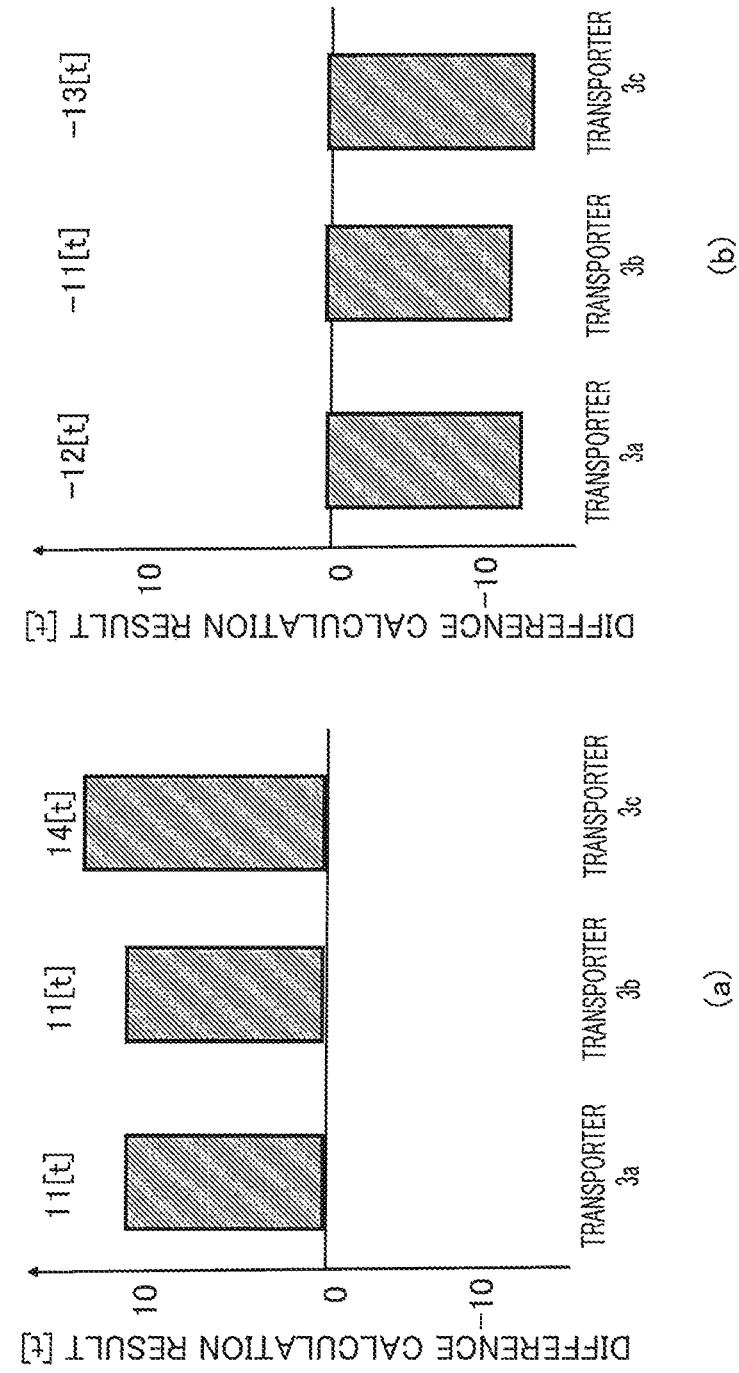
FIG. 40 is a diagram showing forms of correction target determination in the modification.
Figure 41:
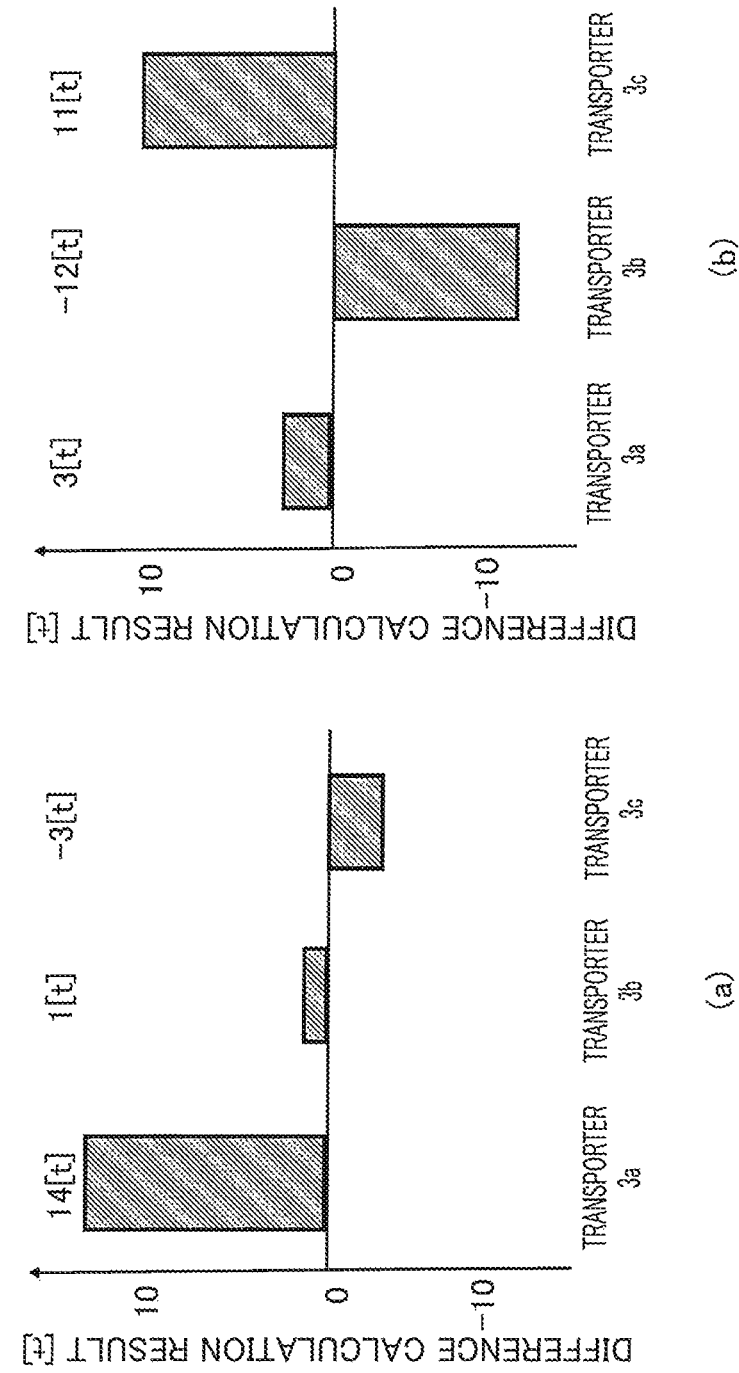
FIG. 41 is a diagram showing forms of the correction target determination in the modification.

In the embodiments explained above, the method of using the difference threshold concerning the determination of the correction target is explained with reference to FIG. 14, FIG. 15, and FIG. 16. However, a method of the correction target determination is not limited to this. For example, as the determination of the correction target, as shown in FIG. 40 and FIG. 41, determination not using the difference threshold is also possible.

In such determination not using the difference threshold, when signs of difference calculation results of all the transporters 3 (transporters 3a to 3c) are the same, the loading-weight calculating unit 400 of the loader 2 is determined as a correction target. That is, when calculation results in all the transporters 3 are smaller than a calculation result in the loader 2 as shown in FIG. 40(a) or when calculation results in all the transporters 3 are larger than a calculation results in the loader 2 as shown in FIG. 40(b), only the loading-weight calculating unit 400 of the loader 2 is the correction target.

The transporter 3 having a maximum absolute value of a difference calculation result only has to be determined as the correction target without using the difference threshold concerning the transporter correction determination as well. Specifically, in the case of FIG. 41(a), since the absolute value of a difference calculation result of the transporter 3a is the maximum "14 (t)", the loadage calculating unit 500a of the transporter 3a is determined as the correction target. In the case of FIG. 41(b), since the absolute value of the difference calculation result of the transporter 3b is the maximum "12 (t)", the loadage calculating unit 500b of the transporter 3b is determined as the correction target.

In the embodiments explained above, the loader 2 has the configuration shown in FIG. 2. However, the loader 2 is not limited to the configuration. For example, any configuration for enabling loading on the transporter 3 such as the number of joints of the work front can be applied. The control circuit of the loader 2 has the configuration shown in FIG. 3. However, the control circuit is not limited to the configuration. For example, it is also possible to cause the main controller 250 to play a role of the weight measurement controller 251 as well. Further, the transporter 3 has the configuration shown in FIG. 4. However, the transporter 3 is not limited to the configuration. The loading work by the loader 2 only has to be possible. For example, the number of wheels is four. However, naturally, a configuration including six wheels can also be applied.

In the first embodiment explained above, an example of the loading weight calculation is explained as a part of the flow shown in FIG. 7. However, the loading weight calculation is not limited to the part of the flow. That is, all means capable of calculating a loading weight of the loader 2 are applicable. For example, the boom lifting operation time is set as a trigger of the bucket load calculation. However, the boom lifting operation time may be replaced with a turning operation of the upper turning body 202 with respect to the lower vehicle body 201. The bucket inclination sensor signal is used for the bucket soil releasing operation determination. However, naturally, an operation signal of the bucket operation lever 242 may be used.

In the first embodiment explained above, an example of the loadage calculation is explained with reference to FIG. 11. However, the loadage calculation is not limited to the example. That is, all means capable of measuring the weight of an object loaded on the vessel 301 are applicable. In this embodiment explained above, the number of transporters is three. However, naturally, the number of transporters is not limited to three. Any number is applicable if the number is plural. Note that three to five transporters are often used in an excavation site assumed by the present invention. Further, in the embodiments explained above, the loader 2 is the hydraulic shovel and the transporter 3 is the dump truck. However, the loader 2 is not limited to the hydraulic shovel and the transporter 3 is not limited to the dump truck. For example, the loader 2 may be a wheel loader.

The correction value calculating method in the embodiments explained above is an example. The correction value calculating method is not limited to the above described content. For example, a configuration for multiplying a difference calculation result by a predetermined coefficient (gain) is possible. With the configuration, sudden changes in the loading weight measurement result and the loadage measurement result are prevented. Discomfort given to the user can be reduced.

EXPLANATION OF REFERENCE SIGNS 1 loading correction system
2 loader
3, 3a, 3b, 3c transporter
206 communication device (communication unit)
270 display monitor (display unit)
306, 306a, 306b, 306c communication device (communication unit)
400 loading-weight calculating unit (loading-weight measuring unit)
401 difference calculating unit
402 difference storing unit
403 correction-target determining unit (threshold setting unit)
404 correction-value calculating unit (correction-implementation determining unit)
405 correction-value storing unit
407 determination-period setting unit
408 recalibration determining unit
500, 500a, 500b, 500c loadage calculating unit (loadage measuring unit)

The invention claimed is:

1. A loadage correction system including one loader and a plurality of transporters, the loadage correction system comprising:
    a loading-weight measuring unit set in the loader, the loading-weight measuring unit measuring a loading weight of a work object loaded by the loader;
    a loadage measuring unit set in the transporter, the loadage measuring unit measuring loadage of the work object loaded on the transporter from the loader;
    a communication unit that performs data transfer of measurement results obtained in the loading-weight measuring unit and the loadage measuring unit;
    a difference calculating unit that calculates a difference between the measurement results of the loading-weight measuring unit and the loadage measuring unit input from the loading-weight measuring unit and the loadage measuring unit directly or via the communication unit;
    a difference storing unit that stores a difference calculation result by the difference calculating unit;
    a correction-target determining unit that determines, using stored information of the difference storing unit, the loading-weight measuring unit or the loadage measuring unit, the measurement result of which needs to be corrected, from the loading-weight measuring unit and the loadage measuring unit; and
    a correction-value calculating unit that calculates a correction value for the loading-weight measuring unit or the loadage measuring unit determined as a correction target by the correction-target determining unit.

2. The loadage correction system according to claim 1, wherein, when difference calculation results for all combinations of measurement results of the loader and the respective transporters stored in the difference storing unit have a same sign, the correction-target determining unit determines the loading-weight measuring unit as the correction target.

3. The loadage correction system according to claim 1, further comprising a threshold setting unit capable of setting a threshold for the difference calculation result stored in the difference storing unit, wherein
    the correction-target determining unit determines, as the correction target, the loadage measuring unit corresponding to the difference calculation result stored in the difference storing unit exceeding the threshold set by the threshold setting unit.

4. The loadage correction system according to claim 1, wherein
    the correction-target determining unit includes a determination-period setting unit capable of setting a period for performing the determination of the correction target, and
    the correction-target determining unit performs the determination using stored information of the difference storing unit in the period set by the determination-period setting unit.

5. The loadage correction system according to claim 1, further comprising a display unit that displays the measurement result of the loading-weight measuring unit or the loadage measuring unit corrected by the correction-value calculating unit, wherein
    the display unit displays a determination result of the correction-target determining unit and a calculation result of the correction-value calculating unit together.

6. The loadage correction system according to claim 1, further comprising a correction-implementation determining unit that determines whether to perform correction of the measurement results of the loading-weight measuring unit and the loadage measuring unit with the correction value calculated by the correction-value calculating unit.

7. The loadage correction system according to claim 5, further comprising a recalibration determining unit that determines necessity of recalibration of the loading-weight measuring unit and the loadage measuring unit from the calculation result of the correction-value calculating unit, wherein
    the display unit displays a determination result of the recalibration determining unit.

8. The loadage correction system according to claim 5, wherein the loader includes the difference calculating unit, the difference storing unit, the correction-target determining unit, the correction-value calculating unit, and the display unit.

* * * * *